US012762217B1

(12) United States Patent
Zhang et al.

(10) Patent No.: US 12,762,217 B1
(45) Date of Patent: Oct. 13, 2026

(54) USING PERIOCULAR REGION FEATURES FOR BIOMETRIC AUTHENTICATION

(71) Applicant: Apple Inc., Cupertino, CA (US)

(72) Inventors: Gendong Zhang, San Jose, CA (US); Andrei Nikiforov, Berlin (DE); Tomi P Maila, San Jose, CA (US); Tom Sengelaub, Oakland, CA (US); Martin Haller, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 18/625,876

(22) Filed: Apr. 3, 2024

Related U.S. Application Data

(60) Provisional application No. 63/585,677, filed on Sep. 27, 2023.

(51) Int. Cl.
*G06F 21/32* (2013.01)

(52) U.S. Cl.
CPC .................................... *G06F 21/32* (2013.01)

(58) Field of Classification Search
CPC ....................................................... G06F 21/32
See application file for complete search history.

(56) References Cited

U.S. PATENT DOCUMENTS 6,289,113 B1 9/2001 McHugh
7,068,820 B2 6/2006 Nakaigawa
7,155,354 B1 12/2006 Mooney
8,433,103 B2 4/2013 Friedman
9,004,687 B2 4/2015 Stack
9,092,051 B2 7/2015 Park et al.
9,767,358 B2 9/2017 Xue
9,959,478 B2 5/2018 Hanna
10,156,900 B2 12/2018 Publicover
10,311,286 B2 * 6/2019 Saripalle ............. G06V 40/197
10,354,158 B2 7/2019 Zhou
(Continued)

FOREIGN PATENT DOCUMENTS

CA 3120035 12/2021
CN 1892676 A 1/2007
(Continued)

OTHER PUBLICATIONS

U.S. Appl. No. 18/534,361, filed Dec. 8, 2023, Saurabh Jane, et al.
(Continued)

*Primary Examiner* — David R Lazaro
(74) *Attorney, Agent, or Firm* — Alexander A. Knapp; Kowert, Hood, Munyon, Rankin & Goetzel, P.C.

(57) ABSTRACT

Methods and apparatus for using periocular region features in a biometric authentication process are disclosed. The periocular region features may be represented by 3D characteristics included in captured data. Also, additional biometric surface information of the periocular region, such as color, reflectivity, etc. may be included in captured data. A periocular region authentication process may use such periocular region information to augment iris information, or as an alternative to iris information. In some embodiments, a trained machine learning model may be used to improve performance of a periocular region biometric authentication process by reducing computational workload.

20 Claims, 18 Drawing Sheets

(56) References Cited

U.S. PATENT DOCUMENTS

| | | | |
|---|---|---|---|
| 10,401,158 | B2 | 9/2019 | Gemoth |
| 10,521,662 | B2 * | 12/2019 | Shenouda Dawoud ..................... G02B 27/0172 |
| 10,872,221 | B2 | 12/2020 | Kumar |
| 10,890,968 | B2 | 1/2021 | Kurlethimar |
| 10,921,883 | B2 | 2/2021 | Onyekwelu |
| 10,970,574 | B2 | 4/2021 | Joshi |
| 11,210,380 | B2 * | 12/2021 | Hoyos ..................... H04L 63/10 |
| 11,762,969 | B1 * | 9/2023 | Khan ..................... G06V 10/70 713/186 |
| 11,906,742 | B2 | 2/2024 | Kaehler et al. |
| 12,462,518 | B2 | 11/2025 | Haller et al. |
| 12,560,997 | B2 | 2/2026 | Sengelaub et al. |
| 2002/0136435 | A1 | 9/2002 | Prokoski |
| 2004/0151347 | A1 | 8/2004 | Wisniewski |
| 2005/0249385 | A1 | 11/2005 | Kondo |
| 2005/0271258 | A1 | 12/2005 | Rowe |
| 2008/0037841 | A1 | 2/2008 | Ogawa |
| 2010/0014931 | A1 | 1/2010 | Matthias |
| 2010/0316263 | A1 | 12/2010 | Hamza |
| 2011/0163163 | A1 | 7/2011 | Rowe |
| 2012/0154536 | A1 | 6/2012 | Stoker et al. |
| 2013/0227651 | A1 | 8/2013 | Schultz |
| 2013/0250087 | A1 | 9/2013 | Smith |
| 2013/0293842 | A1 | 11/2013 | Grenon et al. |
| 2014/0044318 | A1 | 2/2014 | Derakhshani |
| 2014/0044321 | A1 | 2/2014 | Derakhshani |
| 2014/0099005 | A1 | 4/2014 | Mogi |
| 2014/0283113 | A1 | 9/2014 | Hanna |
| 2014/0337221 | A1 * | 11/2014 | Hoyos ................ G06Q 20/3276 705/44 |
| 2015/0205111 | A1 | 7/2015 | Border et al. |
| 2015/0262024 | A1 | 9/2015 | Braithwaite |
| 2015/0316983 | A1 | 11/2015 | Park et al. |
| 2016/0019421 | A1 | 1/2016 | Feng |
| 2016/0087952 | A1 | 3/2016 | Tartz |
| 2016/0117544 | A1 | 4/2016 | Xue |
| 2016/0132735 | A1 | 5/2016 | Derakhshani |
| 2016/0180143 | A1 | 6/2016 | Horesh |
| 2016/0360970 | A1 | 12/2016 | Tzvieli |
| 2017/0124392 | A1 | 5/2017 | Gu |
| 2017/0205875 | A1 | 7/2017 | Kaehler |
| 2017/0206412 | A1 | 7/2017 | Kaehler |
| 2017/0255814 | A1 | 9/2017 | Kaehler |
| 2017/0308763 | A1 | 10/2017 | Salmelin et al. |
| 2017/0337441 | A1 | 11/2017 | Mapen |
| 2018/0025244 | A1 | 1/2018 | Bohl |
| 2018/0032815 | A1 | 2/2018 | Lee |
| 2018/0039846 | A1 | 2/2018 | Grubb |
| 2018/0113508 | A1 | 4/2018 | Berkner-Cieslicki |
| 2018/0120932 | A1 | 5/2018 | Sengelaub |
| 2018/0150690 | A1 | 5/2018 | Yin |
| 2018/0173986 | A1 | 6/2018 | Gousev |
| 2018/0285669 | A1 | 10/2018 | Mapen et al. |
| 2018/0330490 | A1 | 11/2018 | Kido |
| 2018/0349721 | A1 | 12/2018 | Agrawal et al. |
| 2018/0365490 | A1 | 12/2018 | Agrawal |
| 2019/0044723 | A1 | 2/2019 | Prakash |
| 2019/0057268 | A1 | 2/2019 | Burge |
| 2019/0073533 | A1 * | 3/2019 | Chen .................... G06V 40/197 |
| 2019/0094981 | A1 | 3/2019 | Bradski |
| 2019/0278987 | A1 | 9/2019 | Eskilsson |
| 2019/0347483 | A1 | 11/2019 | Krichen |
| 2019/0370450 | A1 | 12/2019 | Fletcher |
| 2019/0387168 | A1 | 12/2019 | Smith |
| 2020/0012105 | A1 | 1/2020 | Liu |
| 2020/0127267 | A1 | 4/2020 | Dulle |
| 2020/0166994 | A1 | 5/2020 | Torneus et al. |
| 2020/0218887 | A1 | 7/2020 | He |
| 2020/0241635 | A1 | 7/2020 | Cohen |
| 2020/0258044 | A1 | 8/2020 | Joshi |
| 2020/0293757 | A1 | 9/2020 | Nilsson |
| 2020/0311238 | A1 | 10/2020 | Ackerman |
| 2020/0334347 | A1 * | 10/2020 | Hoyos ................. H04L 63/0861 |
| 2020/0334478 | A1 | 10/2020 | Hecht |
| 2021/0081652 | A1 | 3/2021 | Matsunami |
| 2021/0173206 | A1 | 6/2021 | Das |
| 2021/0201021 | A1 | 7/2021 | Novelli |
| 2021/0318558 | A1 | 10/2021 | Tzvieli |
| 2021/0334581 | A1 | 10/2021 | Gandara |
| 2021/0365533 | A1 * | 11/2021 | Kaplan .............. G02B 27/0101 |
| 2021/0365535 | A1 | 11/2021 | Casteneda |
| 2021/0383111 | A1 * | 12/2021 | Ackerman ............. G06V 40/19 |
| 2022/0253135 | A1 | 8/2022 | Cohen |
| 2022/0301217 | A1 * | 9/2022 | Stuart ........................ G06T 7/60 |
| 2023/0222197 | A1 * | 7/2023 | Derakhshani ............. G06T 7/60 713/186 |
| 2023/0334909 | A1 | 10/2023 | Haller et al. |
| 2023/0367857 | A1 | 11/2023 | Haller et al. |
| 2023/0377370 | A1 | 11/2023 | Haller et al. |
| 2023/0379564 | A1 | 11/2023 | Haller et al. |
| 2024/0121098 | A1 | 4/2024 | Herder, III et al. |
| 2024/0211569 | A1 | 6/2024 | Zhang et al. |
| 2025/0103693 | A1 | 3/2025 | Maila et al. |
| 2026/0030856 | A1 | 1/2026 | Haller et al. |

FOREIGN PATENT DOCUMENTS

| | | | |
|---|---|---|---|
| CN | 101411606 | A | 4/2009 |
| CN | 101520838 | A | 9/2009 |
| CN | 101814129 | B | 5/2013 |
| CN | 103544420 | | 1/2014 |
| CN | 103870819 | A | 6/2014 |
| CN | 104301633 | A | 1/2015 |
| CN | 105874472 | A | 8/2016 |
| CN | 106462236 | A | 2/2017 |
| CN | 107087431 | A | 8/2017 |
| CN | 104933344 | | 1/2019 |
| CN | 109508695 | | 3/2019 |
| CN | 108830184 | | 4/2021 |
| CN | 113505357 | | 10/2021 |
| CN | 114596622 | | 6/2022 |
| CN | 117233972 | | 12/2023 |
| CN | 113591747 | | 2/2024 |
| EP | 3506196 | | 7/2019 |
| GB | 2471192 | | 12/2010 |
| JP | H10 137225 | | 5/1998 |
| JP | 2017047724 | A | 3/2017 |
| JP | 2017191374 | | 10/2017 |
| JP | 7485448 | B2 | 5/2024 |
| KR | 20180072734 | A | 6/2018 |
| KR | 20180100890 | A | 9/2018 |
| KR | 20200127267 | A | 11/2020 |
| KR | 102483345 | B1 | 12/2022 |
| WO | 98/08439 | | 3/1998 |
| WO | 2017031089 | A1 | 2/2017 |
| WO | 2017/052807 | | 3/2017 |
| WO | 2017/162504 | | 9/2017 |
| WO | 2018/100241 | | 6/2018 |
| WO | 2019/118716 | | 6/2019 |
| WO | 2020/141537 | | 7/2020 |
| WO | 2023149829 | | 8/2023 |

OTHER PUBLICATIONS

U.S. Appl. No. 18/625,876, filed Apr. 3, 2024, Gendong, et al.

Ken Hughes et al., "Detection of Contact-Lens-Based Iris Biometric Spoofs Using Stereo Imaging", 46th Hawaii International Conference on System Sciences, Jan. 1, 2013, pp. 1763-1772 [2013].

Hau T Ngo, et al., "Design and implementation of a multispectral iris capture system", Signals, Systems and Computers, 2009 Conference Record of the Forty-third Asimlomar Conference, IEE, Nov. 1, 2009, pp. 380-384 [2009].

Thavalengal Shejin et al., "Proof-of-concept and evaluation of a dual function visible/NIR camera for iris authentication in smartphones", IEEE Transactions on Consumer Electronics, IEEE Service Center, vol. 61, No. 2, May 2015, pp. 137-143, [2015].

Emine Krichen et al., "Color-Based Iris Verification", Proceedings of ICB: International Conference on Advances in Biometrics, Aug. 27, 2007, pp. 997-1005 [2007].

Sowon Yoon, et al., "Pan-Tilt-Zoom Based Iris Image Capturing System for Unconstrained User Environments at a Distance", Aug.

(56) References Cited

OTHER PUBLICATIONS 27, 2007, ICIAP: International Conference of Image Analysis and Processing, 17th International Conference, pp. 653-662.
Anil K. Jain, et al, "50 years of biometric research: Accomplishments, challenges, and opportunities," Pattern Recognition Letters, Elsevier, Amsterdam, NL, vol. 79, Jan. 12, 2016, pp. 80-105.
Olade, et al., "A Review of Multimodal Facial Biometric Authentication Methods in Mobile Devices and Their Application in Head Mounted Displays," 2018 IEEE SmartWorld, SmartWorld/SCALCOM/UIC/ATC/CBDCom/IOP/SCI, 2018, pp. 1997-2004, doi:10.1109/SmartWorld.2018-00334.
Venkatesh, et al., "A New Multi-spectral Iris Acquisition Sensor for Biometric Verification and Presentation Attack Detection," IEEE, Jan. 2019, pp. 47-54.
Lee Eui Chul, "Fake iris detection method using Purkinje images based on gaze position," Optical Engineering, vol. 47, No. 61, Jun. 2008, XP093275560, p. 067204.
Galbally Javier et al.,. "A review of iris anti=spoofing," 2016 4th International Conference on Biometrics and Forensics (IWBF), IEEE, Mar. 3, 2016, XP032890563, pp. 1-6.
"Information technology—Biometric data Interchange," Part 6: Iris image data, BS ISO/IEC 19794-6:2011+A1:2015, Incorporating corrigenda Apr. 2012 and Sep. 2013, bsi, pp. 1-78.
Tao, et al., "Biometric Authentication System on Mobile Personal Devices," in IEEE Transactions Instrumentation and Measurement, vol. 59, No. 4, pp. 763-773, Apr. 2010.
Okabe, et al., "Smart Device-Based Multimodal Biometric Authentication with the Function for Environment Recognition," 2015 Third International Symposium on Computing and Networking (CANDAR), 2015, pp. 495-498.
Hemery, et al., "Face Authentication for Banking," First International Conference on Advances in Computer-Human Interaction, 2008, pp. 137-142.
Smith-Creasey, et al., "Context Awareness for Improved Continuous Face Authetication on Mobile Devices," 2018 IEEE 16th Intl Conf on Dependable, Autonomic and secure Computing, pp. 644-652, 2018.

* cited by examiner

USING PERIOCULAR REGION FEATURES FOR BIOMETRIC AUTHENTICATION

PRIORITY CLAIM

This application claims benefit of priority to U.S. Provisional Application Ser. No. 63/585,677, entitled "Using Periocular Region Features for Biometric Authentication," filed Sep. 27, 2023, and which is incorporated herein by reference in its entirety.

BACKGROUND

Description of the Related Art

Biometric authentication technology uses one or more biometric aspects of a person to identify that person, for example for secure, authenticated access to devices, systems, etc. Typically, in a registration process, one or more images are captured of biometric aspects to be tracked (e.g., images of a person's iris(es) may be captured), and the images are processed to generate a set of metrics that are unique to, and thus uniquely identify, that person. At a later time, when the person attempts to access the device, system, etc., images of the person's biometric aspects are again captured and processed using a similar algorithm to the one used during registration. Metrics determined from the data captured at the later time are compared to stored metrics from the registration and, if a match between the two is sufficiently good, the person is authenticated.

However, biometric authentication that primarily relies on comparing iris features may suffer from a lack of sufficient data under certain circumstances, such as due to blinking, squinting, eye-rolling, and/or eyelash obstructions, etc. As a result, a person may be required to repeat the biometric authentication process or a match may be evaluated using a less robust dataset.

SUMMARY

Embodiments of methods and apparatus for performing a biometric authentication process using three-dimensional (3D) characteristics are described. 3D characteristics include information about the 3D structure of the periocular region, such as bone structure surrounding the eye and nose shape, amongst others. The 3D structure of the periocular region may also include features of soft tissue surrounding the eye, such as features on the surface of the skin. 3D characteristics may comprise relative depths of periocular region features and may be described using surface normals relative to a surface of periocular region features. Thus, such 3D characteristics are observable features of the periocular region that have a 3D structure and which can be compared to stored information about 3D characteristics of the periocular region that were captured at an enrollment stage. In some embodiments, biometric authentication may consider other biometric surface information in addition to 3D characteristics, such as reflectivity and color. For example, a person attempting biometric authentication may have higher reflectivity of the eye and lower reflectivity of the soft tissue surrounding the eye than another person. Accordingly, 3D characteristics and other biometric surface information can be used in a biometric authentication process or can be used to augment an iris-based authentication process, e.g., as augmenting information.

In some embodiments, 3D characteristics include depth information, surface normals, and/or a full 3D reconstruction of a given periocular region. In some embodiments, 3D characteristics may be a combination of these. In some embodiments, depth information about the periocular region may be obtained by using a depth sensor. In some embodiments, depth information may be obtained from images taken under different lighting conditions or at different camera positions relative to the periocular region or features of the periocular region. In some embodiments, 3D characteristics may be used in combination with other biometric surface information, such as color and reflectivity to authenticate a user. In some embodiments, captured images may be used to determine multiple types of information for use in authentication. For example, images used to generate information about 3D characteristics, such as depth information, a 3D reconstruction, or surface normals may also be used to generate reflectivity and color information based on information included in the images.

In some embodiments, machine learning may allow 3D characteristics to be determined for use in biometric authentication while conserving computer resources. For example, a machine learning model used for biometric authentication may be trained in such a way that the trained machine learning model is capable of generating information representative of 3D characteristics, without actually having to calculate the 3D characteristics themselves. For example, such information can be used in a biometric authentication process by comparing determined embedded features or extracted features, that were embedded or extracted from a machine learning model at the time of registration versus a similarly determined set of embedded or extracted features determined via the machine learning model at a later time of authentication. If the features are sufficiently similar, a match may be determined that fundamentally relies on 3D characteristics present in the input, but without directly calculating the 3D characteristics. For example, an equivalent analysis such as comparing surface normals, depths, or 3D geometries may be achieved without actually having to calculate the surface normals, depths, or 3D structure. This information may be structured as embedded features, extracted features and/or inferences generated by the trained machine learning model. In such embodiments, a trained machine learning model may not need to calculate actual values of the 3D characteristics to generate information that is useful to biometric authentication, wherein the information takes into account the 3D characteristics without directly calculating them.

Also, in some embodiments, a machine learning model may be used to determine 3D characteristics, by actually determining values for the 3D characteristics, using inferences while avoiding more computationally complex calculations necessary to directly calculate the 3D characteristics. For example, a machine learning model may be trained on a set of images that comprise labeled surface normals in order to train the model to determine surface normal values. In some circumstances, images in this set that are used for training may be real-world images or synthetically created images (e.g., outputs of a computer model). For example, a training set of synthetically created images may be used to reduce computer resources needed to label the training set of images, for example by removing a need to calculate and label the surface normals of real-world images. A training set of images used to train a machine learning model to generate information to be used in biometric authentication, such as the ones described above, may include images of both open and closed eyes, which may train the machine learning model to be robust against movement of the eye and thereby may increase the biometric authentication process's resistance to eye movement. A similar approach may be used to train a machine learning model to determine 3D structures of biometric aspects using computer generated representations of 3D structures, wherein the computer-generated 3D structures are also labeled in the computer generation process and are used as training data.

In some embodiments, biometric authentication using 3D characteristics may be performed in combination with iris-based biometric authentication or in combination with other types of authentications. Also, biometric authentication using 3D characteristics may be used as an alternative to iris-based biometric authentication or other types of authentications. A password-based authentication may be replaced with biometric authentication, as an example. In some embodiments, a periocular region 3D characteristics match may augment an iris-based authentication process (or other type of authentication process) and may be used to reduce a threshold of similarity required for authentication. In some embodiments, biometric authentication based on periocular region 3D characteristics may be performed with an open or closed eye.

Figure 1A:
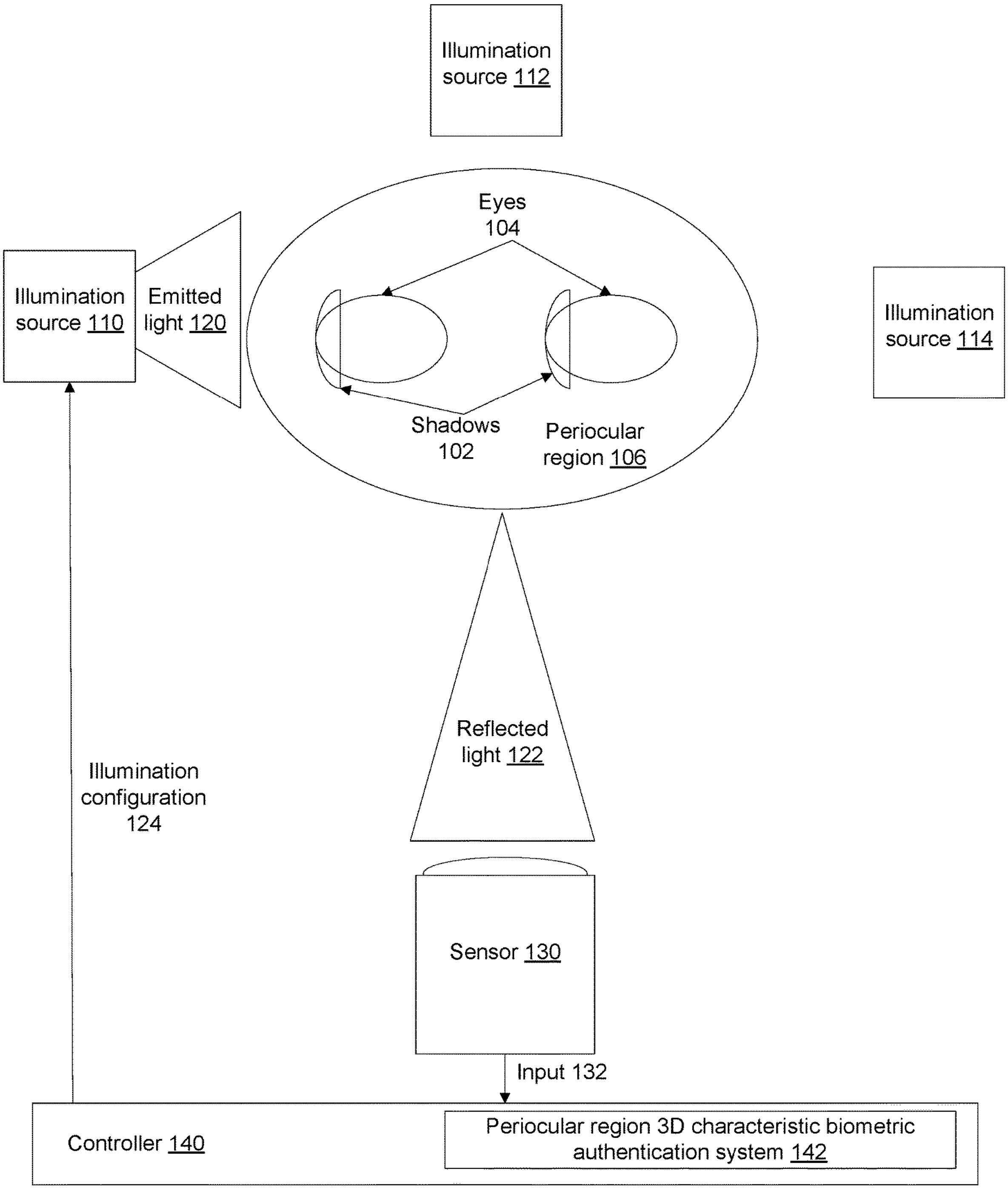
FIG. 1A illustrates a controller causing a light source and sensor to generate input comprising 3D characteristic information resulting from light interactions with the periocular region such that reflected light includes information about the 3D characteristics of the periocular region, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for using 3D characteristics of a periocular region in a biometric authentication process are described. Biometric authentication may be performed based on a set of features, called biometric aspects, likely to be unique to a user of a biometric authentication process. A generated biometric template may be an enrollment template, and the enrollment template may be stored such that a processor may later compare the enrollment template to a subsequently received biometric input, which may be processed into a match template, associated with a request for authentication. Biometric authentication may include biometric identification of a user, for example, identifying one enrolled user from a set of enrolled users based on a comparison of a match template to enrollment templates corresponding to users of the set of users. In some embodiments, a periocular region may include one or more biometric aspects. In some embodiments, a biometric aspect may have 3D characteristics and additional biometric surface information. In some embodiments, 3D characteristics of a biometric aspect may include a structure of a periocular region comprising the biometric aspect. Also, in some embodiments, such 3D characteristics may be described using geometric characteristics of a surface of a biometric aspect, such as surface normals and depth information. In some embodiments, the 3D structure of a periocular region (that may include one or more biometric aspects) may be reconstructed for comparison to a 3D reconstruction template (e.g., reconstructed from input information previously received).

Additionally, in some embodiments, biometric surface information may include information about other characteristics of a periocular region, such as reflectivity and/or a color of the skin and eye included in the periocular region. In some embodiments, periocular region biometric authentication may reduce excess use of user time and computer resources by enabling authentication without repeat attempts to image the iris. Also, periocular region biometric authentication based on 3D characteristics may be resistant to eye movement and eye closure. For example, periocular region biometric authentication may be used as an alternative to iris-based authentication processes or may be used to expedite an iris-based authentication process, for example by providing augmenting data.

In some embodiments, periocular biometric authentication may be performed, and/or made more efficient, by using a machine learning model. In some embodiments, a trained machine learning model may be used to generate embedded features which may be used to generate inferences about a biometric aspect's 3D characteristics. In some embodiments, 3D characteristics of a biometric aspect may be used in an authentication process from information about the 3D characteristics in the input (e.g., shadows), without directly calculating the 3D characteristics. Also, in some embodiments, a machine learning model may be used to more efficiently determine the 3D characteristics, for example via inference, without directly having to calculate the 3D characteristics. For example, a machine learning model may be trained with a set of training images that include labels for 3D characteristics. Accordingly, the machine learning model can be trained to determine the 3D characteristics, such as surface normals or 3D geometry. In some embodiments, a set of such training images may be synthetically created and labeled. These images may be used to train the machine learning model to recognize 3D characteristics (e.g., surface normal or 3D structure), and make inferences about their values. A synthetically created training dataset may avoid a need to calculate the values of real-world 3D characteristics (e.g., surface normals or 3D structure).

In some embodiments, in which a machine learning model is used to reason about 3D characteristics as part of a periocular region biometric authentication process (without directly calculating the 3D characteristics), a set of training images may comprise images labeled according to whether they are valid matches of a person or invalid matches of a person (such as a real image capture of a person and a fabricated version of an image capture or an image of an image capture). Also, non-matched valid and invalid images may be used for training. These labeled images may be used to train the machine learning model to consider human-selected standards of quality images or images that have been successfully used in a biometric authentication process. A set of training images comprising labeled valid and invalid images may be used to train the machine learning model to ignore input that may have been captured when no user was present or under unexpected lighting conditions and may allow the trained machine learning model to make inferences regarding whether an image may be useful in a biometric authentication process. In some embodiments, a dataset used to train the trained machine learning model may include images comprising an open eye and images comprising a closed eye. A training dataset comprising both open and closed eyes may be used to train the machine learning model such that periocular region biometric authentication can be performed whether the eye is open or closed. The same training dataset may also be used to train the machine learning model to differentiate between images comprising an open eye and images comprising a closed eye so the trained machine learning model may be able to make a decision as to whether to bypass an iris-based biometric authentication and proceed to the periocular region biometric authentication process.

FIG. 1A illustrates a controller causing a light source and sensor to generate input comprising 3D characteristic information resulting from light interactions with the periocular region such that reflected light includes information about the 3D characteristics of the periocular region, according to some embodiments.

For example, FIG. 1A shows a periocular region 106 interacting with light 120 emitted from an illumination source 110. Information about 3D characteristics may be obtained by using an illumination source 110 to direct light at a periocular region 106 from a known illumination source position and by using a sensor 130, such as a camera, located in a known sensor position relative to the illumination source 110. More specifically, emitted light 120 from an illumination source 110 may cast shadows 102 in areas of the periocular region 106 where there is a change in depth, such as near the eyes 104. The reflected light 122 from the periocular region 106 captured by the sensor 130 may include this information that is indicative of the 3D characteristics of the periocular region 106. In some embodiments, information that is indicative of depth may be used as 3D characteristics. In some embodiments, depth information may be calculated from images including shadows, such as shadows 102, and used as a 3D characteristic. For example, by knowing the relative position of the light source 110 relative to the sensor 130, the size and shape of the shadows 102 can be used to calculate 3D characteristics of a biometric aspect (e.g., bone structure, nose, etc.) that cast the shadows 102 when exposed to light 120 emitted in a given direction from the illumination source 110 and when viewed with a camera having a known camera angle relative to the illumination source 110.

Depending on the illumination configuration selected by the controller 140, different ones of the illumination sources 110, 112, and 114 may be activated to emit light 120. These are example illumination sources and embodiments may use more or fewer illumination sources in the same locations or different locations. The controller 140 that sends the illumination configuration instructions 124 to the illumination sources 110, 112, and 114, and which receives input 132 from the sensor 130 may be the same controller 140 that runs a periocular region 3D characteristic biometric authentication system 142, or a separate controller may be used. Also, while not shown in FIG. 1A, in some embodiments, multiple sensors 130 may be used, and may be located in different locations with different known viewing angles of the periocular region 106. In some embodiments, light 120 emitted from the illumination source 110 is visible light, but it should be understood that other kinds of light perceivable to a sensor 130 (e.g., such as infrared) may be used.

Figure 1B:
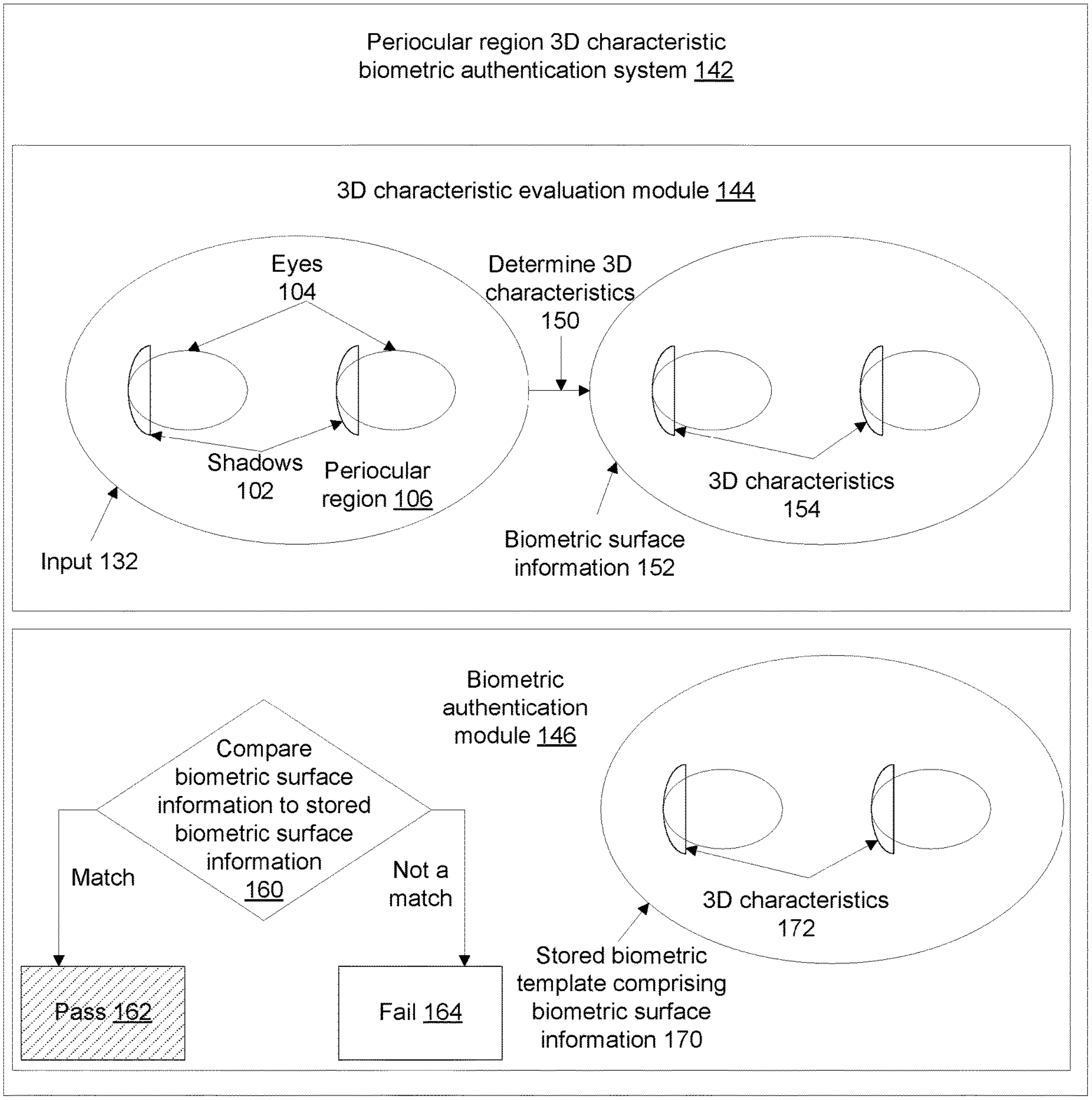
FIG. 1B is a graphical representation of a controller evaluating input comprising 3D characteristic information resulting from light interactions with a periocular region (e.g., as shown in FIG. 1A) by generating biometric surface information to compare with stored biometric surface information, according to some embodiments.

FIG. 1B is a graphical representation of a controller evaluating input comprising 3D characteristic information resulting from light interactions with a periocular region (e.g., as shown in FIG. 1A) by generating biometric surface information to compare with stored biometric surface information, according to some embodiments.

In FIG. 1B, the input 132 received by the controller 140 in FIG. 1A is evaluated by a 3D characteristic evaluation module 144 to generate biometric surface information 152 to be compared to a stored biometric template comprising biometric surface information 170 in a biometric authentication module 146. The periocular region 3D characteristic biometric authentication system 142 which includes the 3D characteristics evaluation module 144 and the biometric authentication module 146 is further described in FIG. 2.

The shadows 102 caused by of the interaction of features of the periocular region 106 with light 120 emitted from the illumination source 110 comprise information about 3D characteristics 154. The 3D characteristic evaluation module 144 is configured to determine 3D characteristics 150 from the input 132 to generate biometric surface information 152 including 3D characteristics 154. The biometric authentication module 146 may include, or otherwise access, a stored biometric template comprising biometric surface information 170. This template includes 3D characteristics 172, such as may have been determined during a registration process. In some embodiments the 3D characteristics 172 may be stored in various formats, such as determined surface normal, determined 3D structures, determined extracted or embedded features of machine learning model, etc. The biometric authentication module 146 may compare (160) the biometric surface information 152 to the stored biometric template comprising biometric surface information 170. If the biometric surface information 152 and the stored biometric template comprising biometric surface information 170 match, the biometric authentication module 146 may determine the comparison 160 results in a sufficiently close match, labeled as pass 162. If the biometric surface information 152 and the stored biometric template comprising biometric surface information 170 do not match, the biometric authentication module 146 may determine the comparison 160 results do not match, labeled as fail 164. In some embodiments, a similarity scoring algorithm may be used to determine "a match" and various thresholds may be used, such as similarity score indicating a match of greater than X % (e.g., 90%, 95%, 99%, etc.) is required to considered a set of biometric surface information as a matching set. Whether the biometric authentication module 146 determines the comparison (160) results in a pass 162 or a fail 164 may cause a biometric authentication process to be completed, or it may be a step of a larger biometric authentication process. For example, determining a biometric surface match may be a preceding or subsequent step to determining an iris match, as an example. In the example shown in FIG. 1B, the biometric surface information 152 was sufficiently similar to the stored biometric template comprising biometric surface information 170 to result in a pass 162.

Figure 1C:
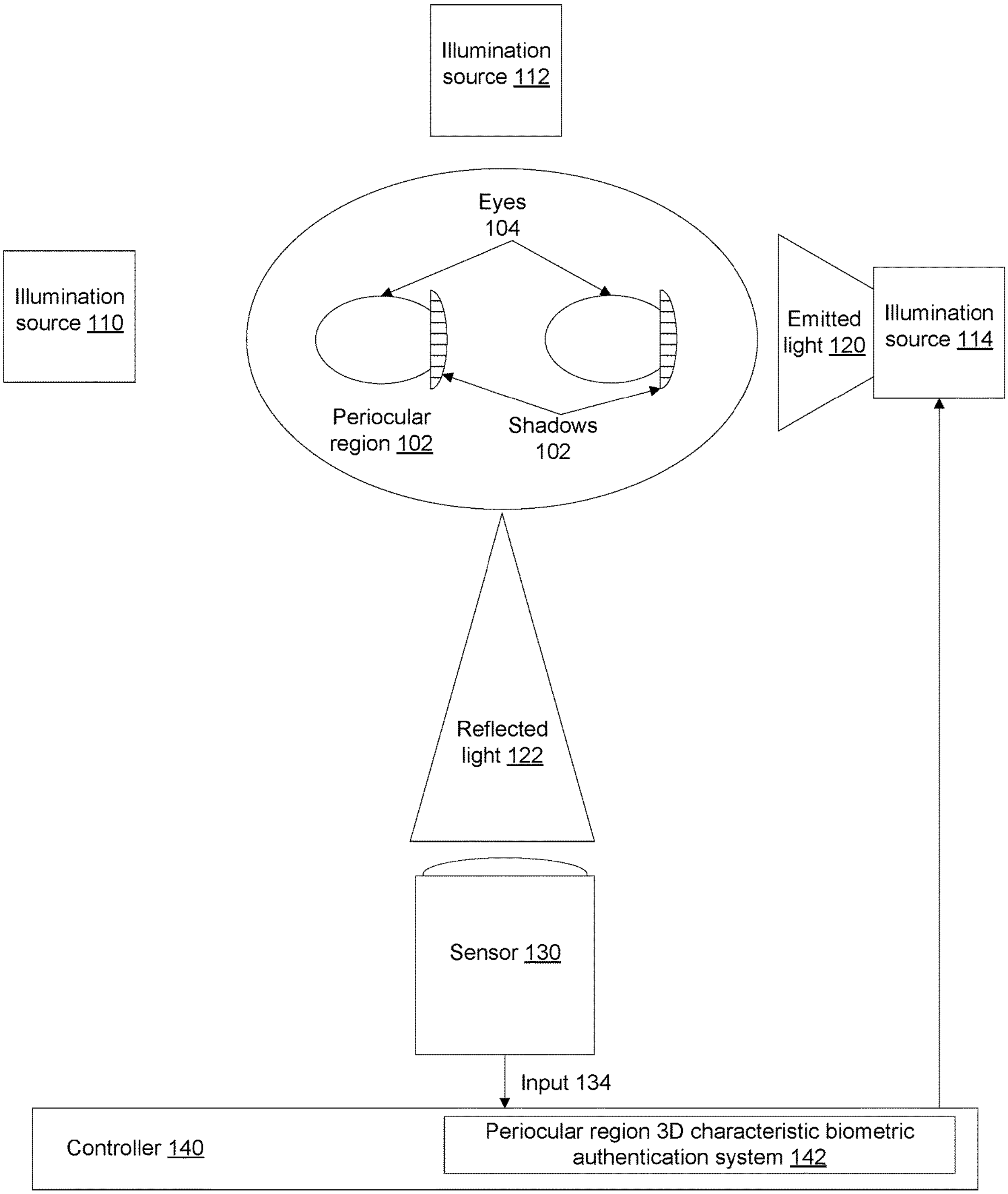
FIG. 1C illustrates a controller causing a light source and sensor to generate input comprising 3D characteristic information resulting from different light interactions with the periocular region due to an alternative illumination condition being applied to generate another instance of biometric surface information for use in comparison with stored biometric surface information, according to some embodiments.

FIG. 1C illustrates a controller causing a light source and sensor to generate input comprising 3D characteristic information resulting from different light interactions with the periocular region due to an alternative illumination condition being applied to generate another instance of biometric surface information for use in comparison with stored biometric surface information, according to some embodiments.

In the example shown in FIG. 1C, the controller 140 selects a different illumination configuration 126 than the illumination configuration 124 selected in FIG. 1A. The different illumination configuration 126 causes a different illumination source 114 to emit light 120. This change causes the shadows 102 to appear in a different position than the shadows 102 seen in FIG. 1A. The appearance of the shadows 102 is captured by the sensor 130 and sent to the controller 140 as input 134. In this example, the person attempting biometric authentication is not the enrolled user whose periocular region 106 was used to generate the stored biometric template comprising biometric surface information 174.

Figure 1D:
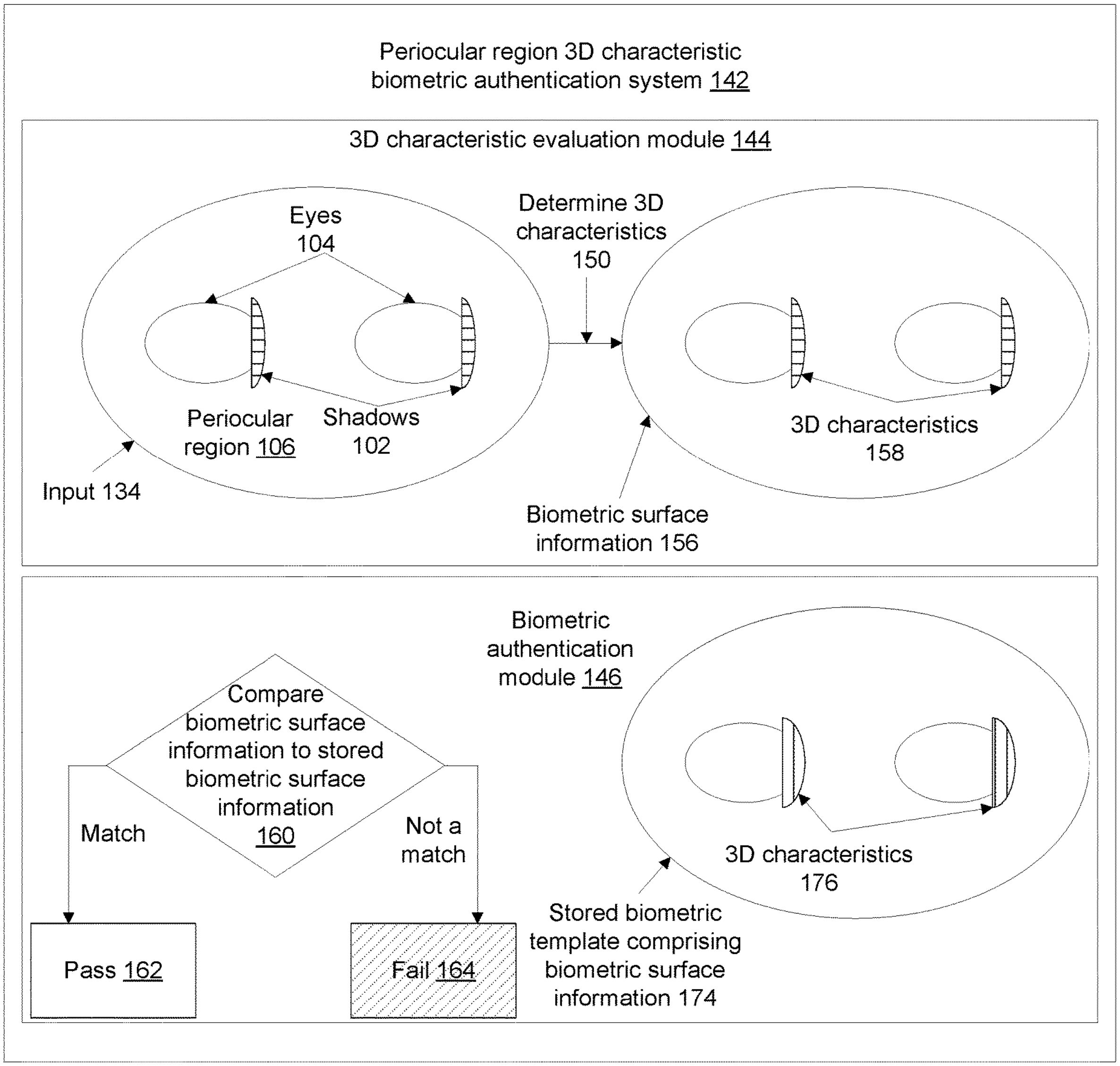
FIG. 1D is a graphical representation of a controller evaluating input comprising 3D characteristic information resulting from different light interactions with the periocular region due to an alternative illumination condition being applied (such as shown in FIG. 1C), according to some embodiments.

FIG. 1D is a graphical representation of a controller evaluating input comprising 3D characteristic information resulting from different light interactions with the periocular region due to an alternative illumination condition being applied (such as shown in FIG. 1C), according to some embodiments.

In FIG. 1D, the 3D characteristic evaluation module 144, which may be implemented on controller 140, determines 3D characteristics 150 from the input 134, e.g., the input received by the controller 140 in FIG. 1C. At 160, the biometric authentication module 146 compares the biometric surface information 156 comprising 3D characteristics 158 to the stored biometric template comprising biometric surface information 174 comprising 3D characteristics 176 to determine whether or not they are a match. In this example, the stored biometric template comprising biometric surface information 174 includes biometric surface information corresponding to the illumination configuration 126. The biometric authentication module 146 may select the appropriate biometric surface information to use for match comparison by selecting a set of biometric surface information labeled as being generated with a given illumination configuration, such as illumination configuration 126, and which includes 3D characteristics 176 that correspond to the illumination configuration 126. Because the person attempting a biometric authentication process has different 3D characteristics 158 than the 3D characteristics 176 of the enrolled user whose periocular region 106 was used to generate the stored biometric template comprising biometric surface information 174, the biometric surface information 156 and the stored biometric template comprising biometric surface information 174 do not match. The biometric authentication module 146 decides the comparison 160 results in a fail 164.

Figure 1E:
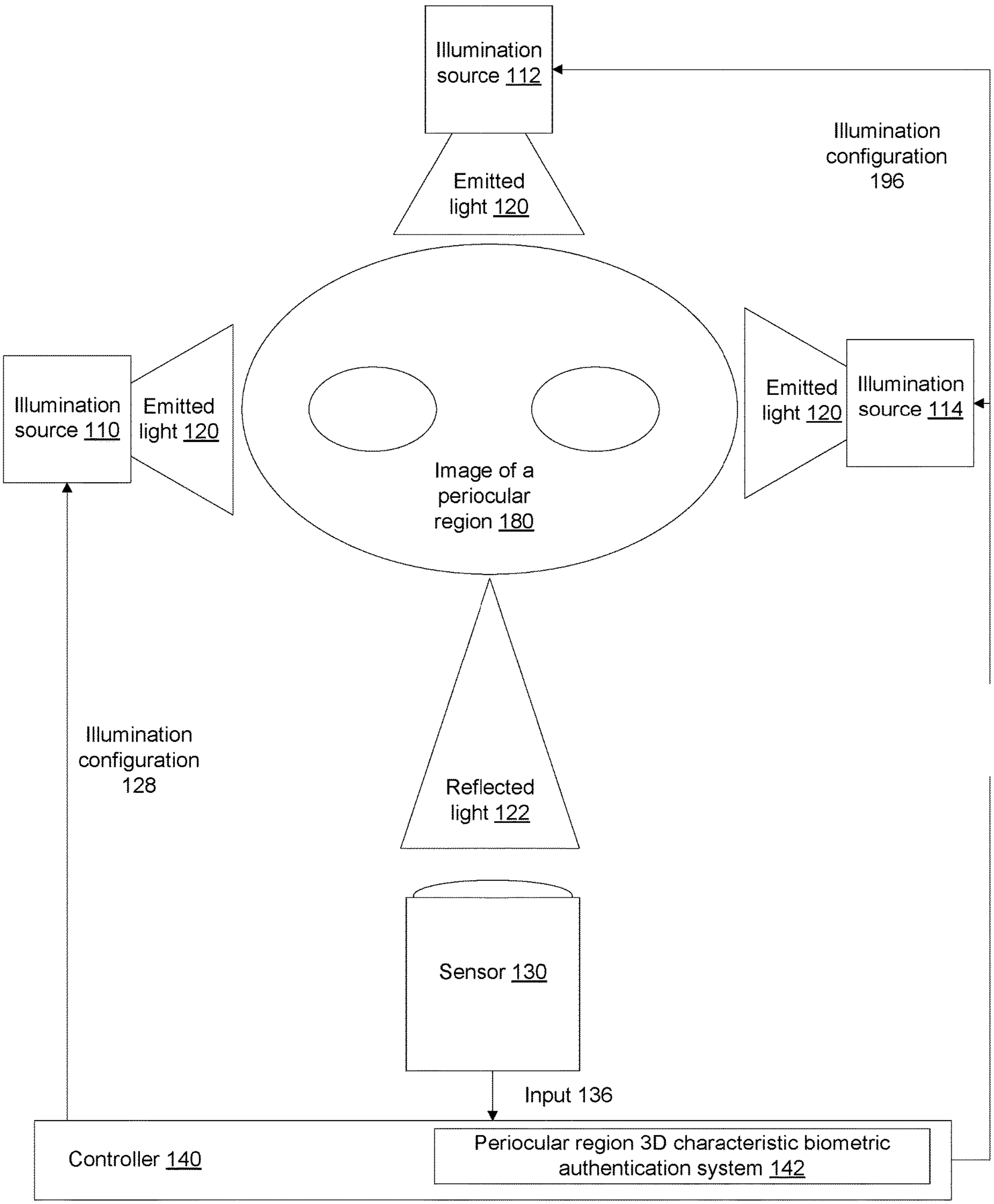
FIG. 1E illustrates a previously captured image of a periocular region being presented for authentication instead of an actual periocular region reflecting light, wherein light reflected off of the previously captured image does not include similar information about the 3D characteristics of the periocular region as would be the case if the actual periocular region was presented for authentication, according to some embodiments.

FIG. 1E illustrates a previously captured image of a periocular region being presented for authentication instead of an actual periocular region reflecting light, wherein light reflected off of the previously captured image does not include similar information about the 3D characteristics of the periocular region as would be the case if the actual periocular region was presented for authentication, according to some embodiments.

In FIG. 1E, the controller 140 selects a different illumination configuration 128 for the illumination sources 110, 112, and 114. In this example, there is no periocular region 106, and instead there is an image of a periocular region 180. For example, whereas an actual periocular region has a 3D depth and therefore will cast shadows, an image of periocular region, such as on a sheet of paper, may be flat and therefore not cast shadows in the same way as an actual periocular region. As a result, there are not shadows 102 generated by the interaction of emitted light 120 with a periocular region, so the reflected light 122 and captured input 136 do not include information about 3D characteristics of a periocular region.

Figure 1F:
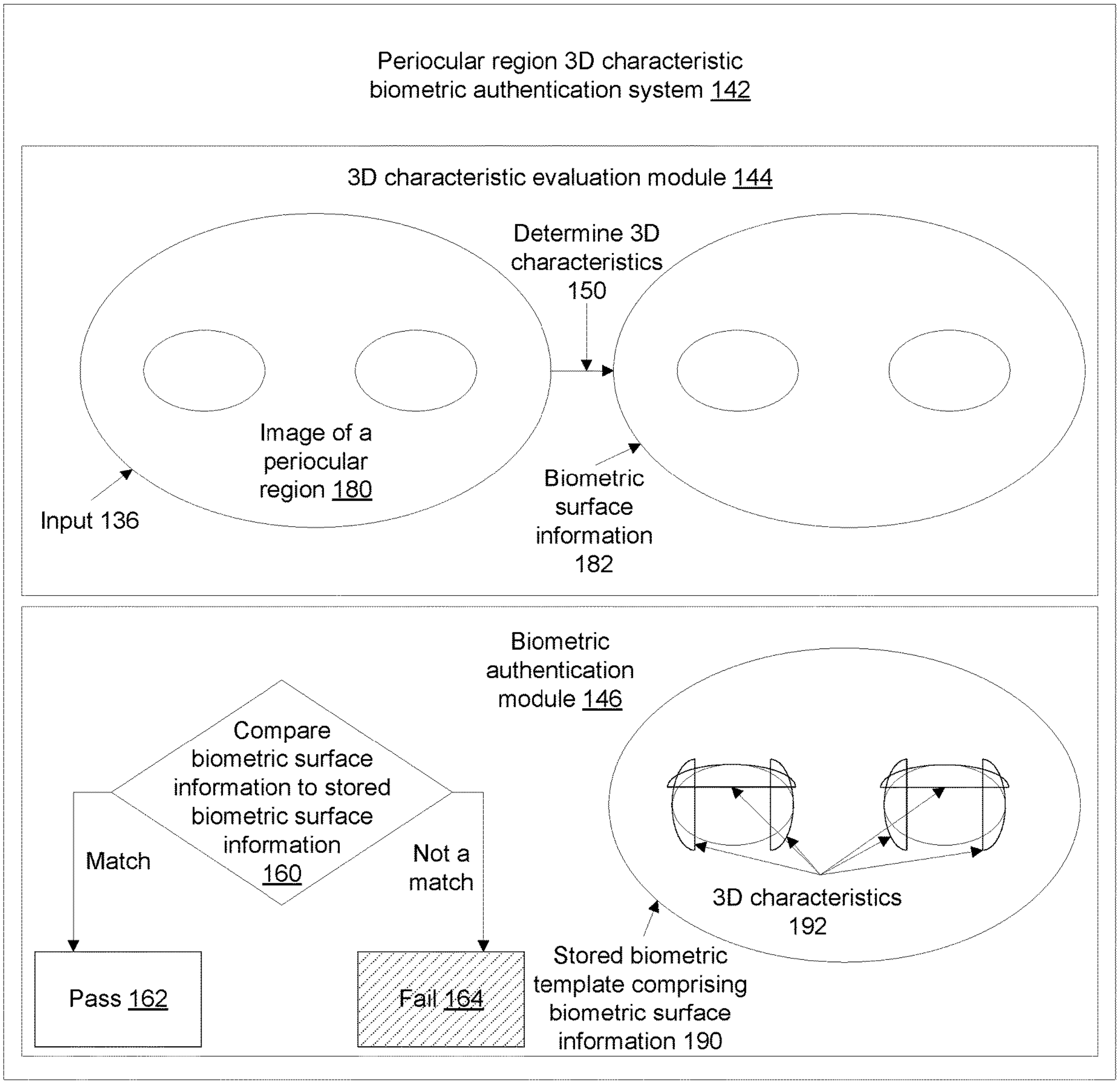
FIG. 1F is a graphical representation of a controller evaluating input comprising a lack of information about the 3D characteristics of the periocular region, which may cause a biometric authentication process to decide the input is of an insufficient quality to be used in an authentication process, according to some embodiments.

FIG. 1F is a graphical representation of a controller evaluating input comprising a lack of information about the 3D characteristics of the periocular region, which may cause a biometric authentication process to decide the input is of an insufficient quality to be used in an authentication process, according to some embodiments.

In FIG. 1F, the 3D characteristic evaluation module 144 attempts to determine 3D characteristics 150 of a periocular region from the input 136 received by the controller 140, such as shown in FIG. 1E which was generated by an image of a periocular region 180. However, the biometric surface information 182 generated by the 3D characteristic evaluation module 144 lacks 3D characteristics because there is no depth in a flat image that emitted light 120 may interact with to form shadows of otherwise generate information about 3D characteristics. The biometric authentication module 146 selects 3D characteristics 192 labeled as corresponding to the illumination configuration 128 from a stored biometric template comprising biometric surface information 190 (e.g., that portion of the biometric surface information in the stored template was generated from images that were illuminated with the selected illumination configuration). Once the correct portion of the biometric surface information is selected, it can then be compared to the biometric surface information currently being determined from images that were captured with the same illumination configuration applied. The biometric authentication module 146 compares 160 the biometric surface information 182 and the stored biometric template comprising biometric surface information 190 and determines the comparison 160 results in a fail 164.

Figure 2:
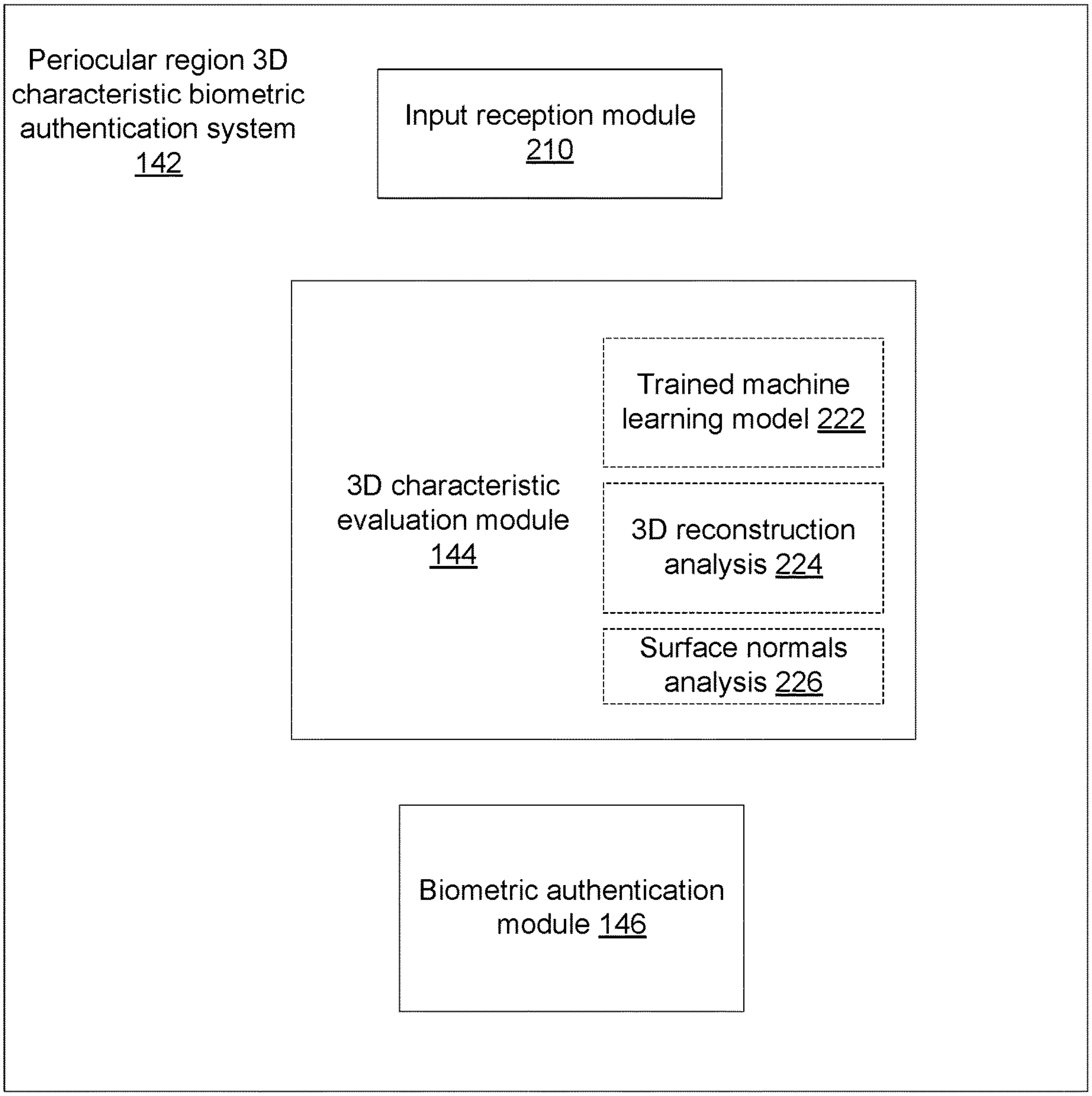
FIG. 2 is a block diagram illustrating components of an example periocular region 3D characteristic biometric authentication system, according to some embodiments.

FIG. 2 is a block diagram illustrating components of an example periocular region 3D characteristic biometric authentication system, according to some embodiments.

FIG. 2 shows possible components of a periocular region 3D characteristic biometric authentication system 142. A periocular region 3D characteristic biometric authentication system 142 may include an input reception module 210 to enable the system to receive input from sensors 130. A periocular region 3D characteristic biometric authentication system 142 may include a 3D characteristic evaluation module 144 to analyze the input and determine 3D characteristics and other biometric surface information. The 3D characteristic evaluation module 144 may analyze input using a trained machine learning model 222, 3D reconstruction analysis 224, surface normals analysis 226, or some combination of these or other evaluation methods. Examples of these three possible evaluation types are further described in FIGS. 4A-C. A periocular region 3D characteristic biometric authentication system 142 may include a biometric authentication module 146 to perform or contribute to a biometric authentication process. Examples of the biometric authentication module 146 are further described in FIG. 1 and FIGS. 4A-C.

Figure 3:
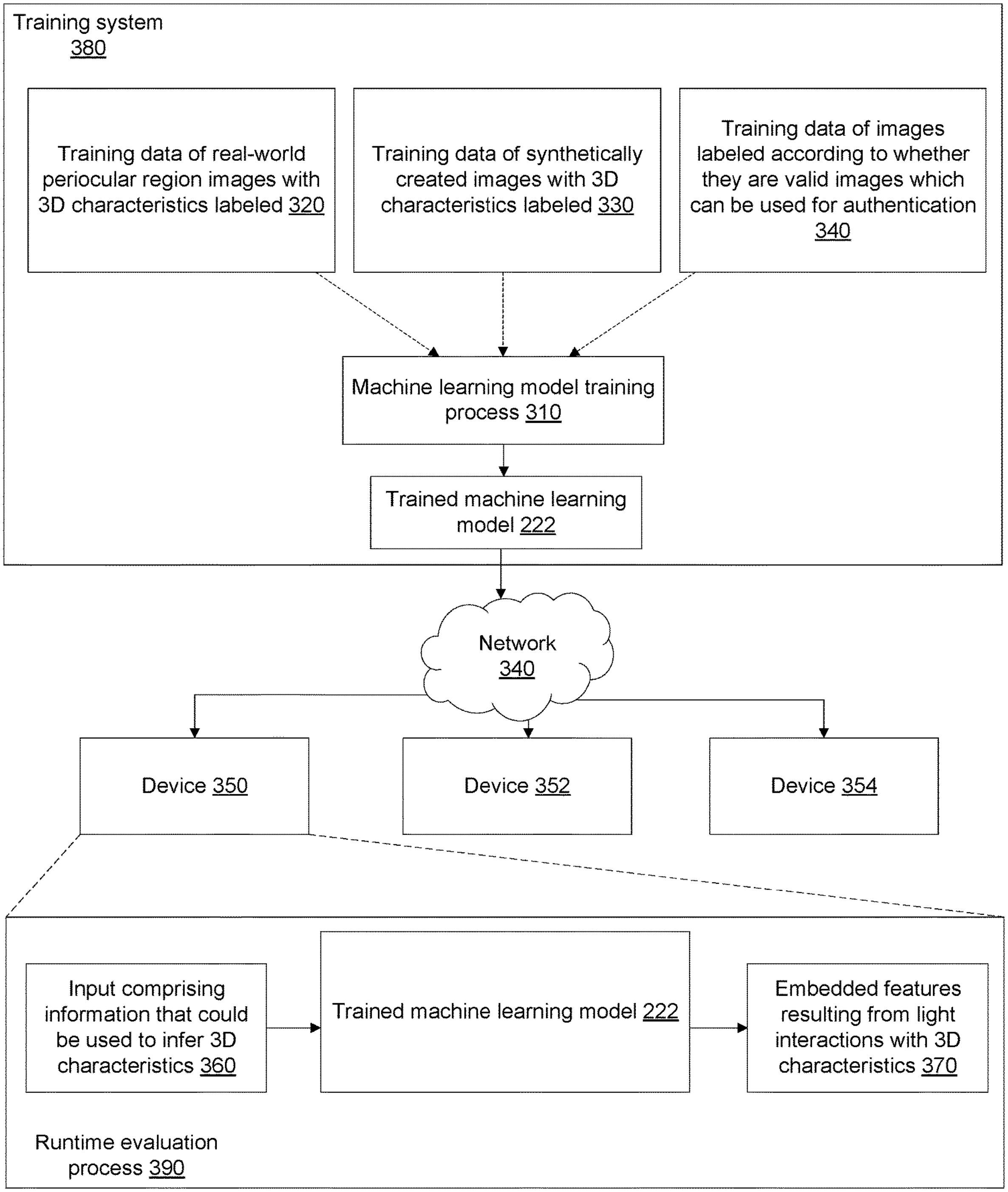
FIG. 3 is a block diagram illustrating a remote training system that trains a machine learning model for use in periocular region-based authentication and a set of devices that use the trained machine learning model to perform periocular region-based authentication, according to some embodiments.

FIG. 3 is a block diagram illustrating a remote training system that trains a machine learning model for use in periocular region-based authentication and a set of devices that use the trained machine learning model to perform periocular region-based authentication, according to some embodiments.

For example, in FIG. 3, a training system 380 generates a trained machine learning model 222 so that it may be used in a runtime evaluation process 390 to analyze input comprising information that could be used to infer 3D characteristics 360, e.g., shadows 102. The three sets of training data shown 320, 330, and 340 are sets of training data which may be used in some embodiments to create a trained machine learning model 222. A machine learning model training process 310 may use a set of training data comprising one of the sets of training data shown, a set of training data comprising more than one of the sets of training data shown, or a set of training data that comprises some combination of the sets of training data shown.

A set of training data of real-world periocular region images with 3D characteristics labeled (320) may be used to train the machine learning model to ascertain 3D characteristics of real-world periocular regions. A set of training data of synthetically created images with 3D characteristics labeled (330) may be used to train the machine learning model how to ascertain 3D characteristics, without requiring that calculations to ascertain the 3D characteristics from real world images be performed to generate the set of training data. A set of training data of images labeled according to whether they are valid images for authentication 340 may be used to train the machine learning model to ignore images are not considered useful for determining 3D characteristics of a periocular region, such as images that were not generated from a real-world periocular region. Images that are valid may be images that have been determined to be useful for determining 3D characteristics, such as images of a periocular region captured at a known illumination configuration. Invalid images may be images that have been determined to not be useful for determining 3D characteristics and include images of objects other than a periocular region, images with significant blurring or obstruction, and images captured at an unexpected illumination condition, such as a complete absence of light. In some embodiments, the sets of training data may include images of eyes in an open or closed state. Training data comprising images of closed eyes and images of open eyes may be used to train the machine learning model that the state of the eye is not relevant to authentication based on 3D characteristics of the periocular region.

The trained machine learning model may be used by one or more devices, such as devices 350, 352, and 354. In some embodiments, the trained model may be distributed through a network 340 to be used in a runtime evaluation process 390, at the respective devices, to determine 3D characteristics by analyzing input comprising information that could be used to infer 3D characteristics 360 and generating inferences, such as embedded features, from light interactions with 3D characteristics 370 from that analysis. The generated inferences may be compared to stored inferences resulting from light interactions with 3D characteristics of an enrolled user's periocular region.

Figure 4A:
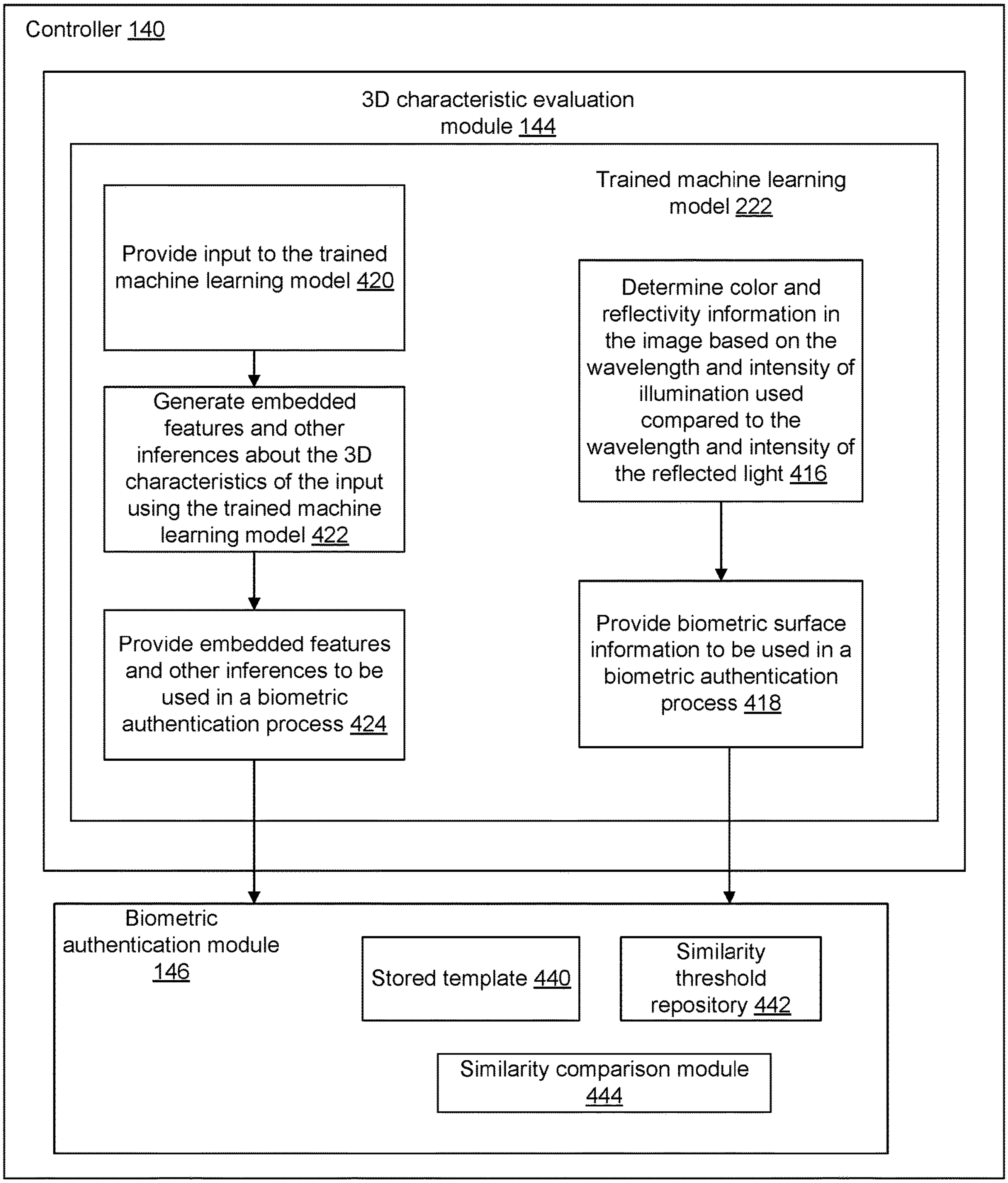
FIG. 4A is block diagram illustrating components of a periocular region 3D characteristic biometric authentication system that uses a trained machine learning module to perform biometric authentication, according to some embodiments.

FIG. 4A is block diagram illustrating components of a periocular region 3D characteristic biometric authentication system that uses a trained machine learning module to perform biometric authentication, according to some embodiments.

In FIG. 4A, controller 140 implements 3D characteristic evaluation module 144, which uses a trained machine learning model 222 to evaluate input of the periocular region. For example, to perform the evaluation, at 420, input is provided to the trained machine learning model. At 422, the trained machine learning model generates embedded features and other inferences about the 3D characteristics of the input. At 424, the 3D characteristic evaluation module 144 provides the embedded features and other inferences to be used in a biometric authentication process. At 416, the 3D characteristic evaluation module 144 also determines color and reflectivity information from the input based on the wavelength and intensity of illumination used in comparison to the wavelength and intensity of the illumination configuration used and, at 418, provides this biometric surface information to be used in a biometric authentication process.

The biometric authentication process may be carried out by a biometric authentication module 146 implemented on the controller 140. The biometric authentication module 146 may include, or otherwise access, a stored template 440, a similarity threshold repository 442, and a similarity comparison module 444. A similarity comparison module 444 may use the information provided by the 3D characteristic evaluation module 144 and the stored template 440 to generate a similarity score, which the biometric authentication module 146 may compare to thresholds stored in the similarity threshold repository 442 to determine what action should be taken as a result of the score generated by the similarity comparison module 444.

Figure 4B:
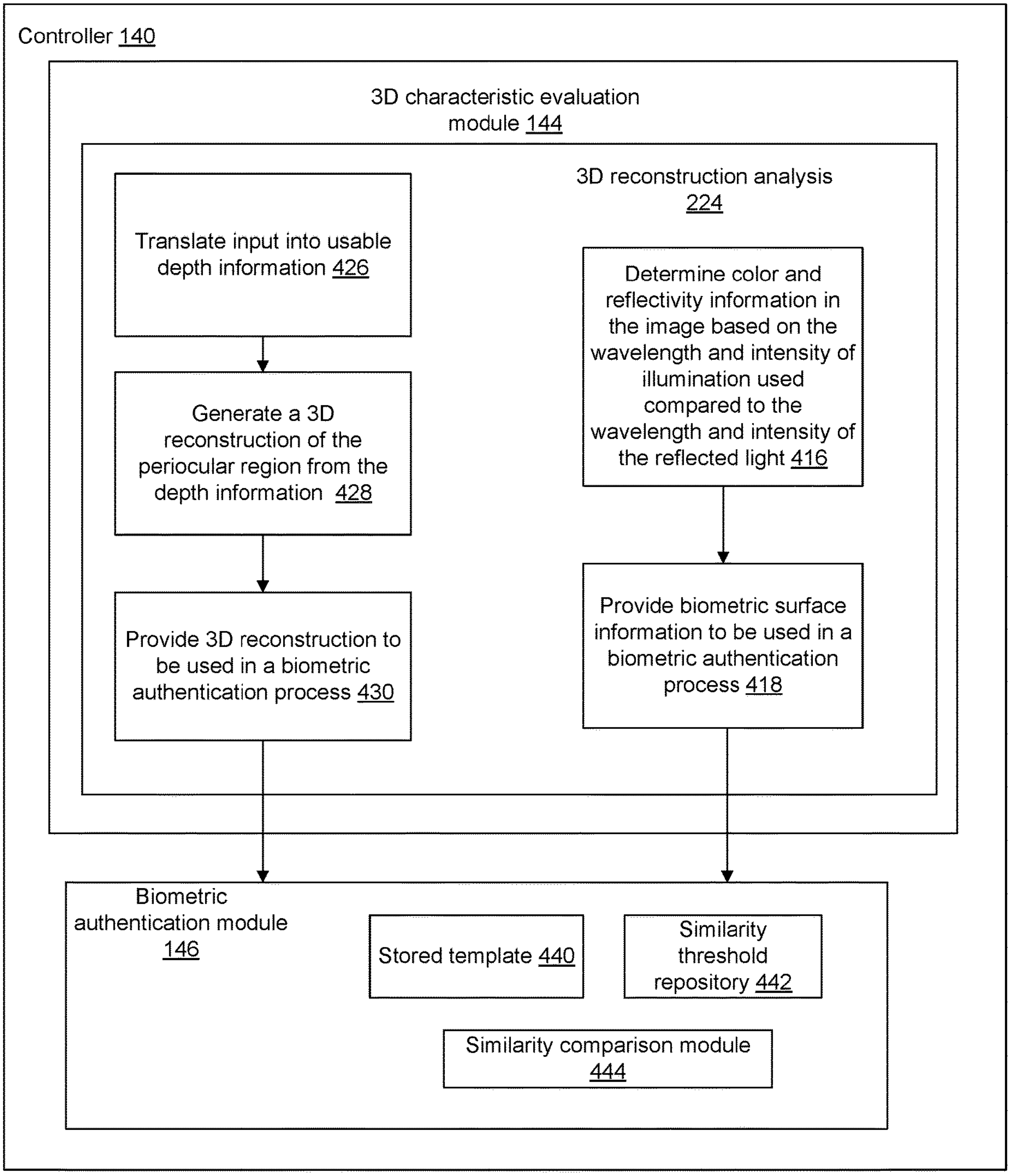
FIG. 4B is block diagram illustrating components of a periocular region 3D characteristic biometric authentication system that uses 3D reconstruction to perform biometric authentication, according to some embodiments.

FIG. 4B is block diagram illustrating components of a periocular region 3D characteristic biometric authentication system that uses 3D reconstruction to perform biometric authentication, according to some embodiments.

In FIG. 4B, the 3D characteristic evaluation module 144, implemented via controller 140, performs 3D reconstruction analysis 224. At 426, an input captured by the sensors 130 is translated into usable depth information. At 428, the 3D characteristic evaluation module generates a 3D reconstruction of the periocular region from the depth information. At 430, the 3D characteristic evaluation module 144 provides the 3D reconstruction to be used in a biometric authentication process. At 416, the 3D characteristic evaluation module 144 also determines color and reflectivity information from the input based on the wavelength and intensity of illumination used in comparison to the wavelength and intensity of the illumination configuration used and, at 418, provides this biometric surface information to be used in a biometric authentication process.

The biometric authentication process may be carried out by a biometric authentication module 146 via the controller 140. The biometric authentication module 146 may comprise a stored template 440, a similarity threshold repository 442, and a similarity comparison module 444. A similarity comparison module 444 may use the information provided by the 3D characteristic evaluation module 144 and the stored template 440 to generate a similarity score, which the biometric authentication module 146 may compare to thresholds stored in the similarity threshold repository 442 to determine what action should be taken as a result of the score generated by the similarity comparison module 444.

Figure 4C:
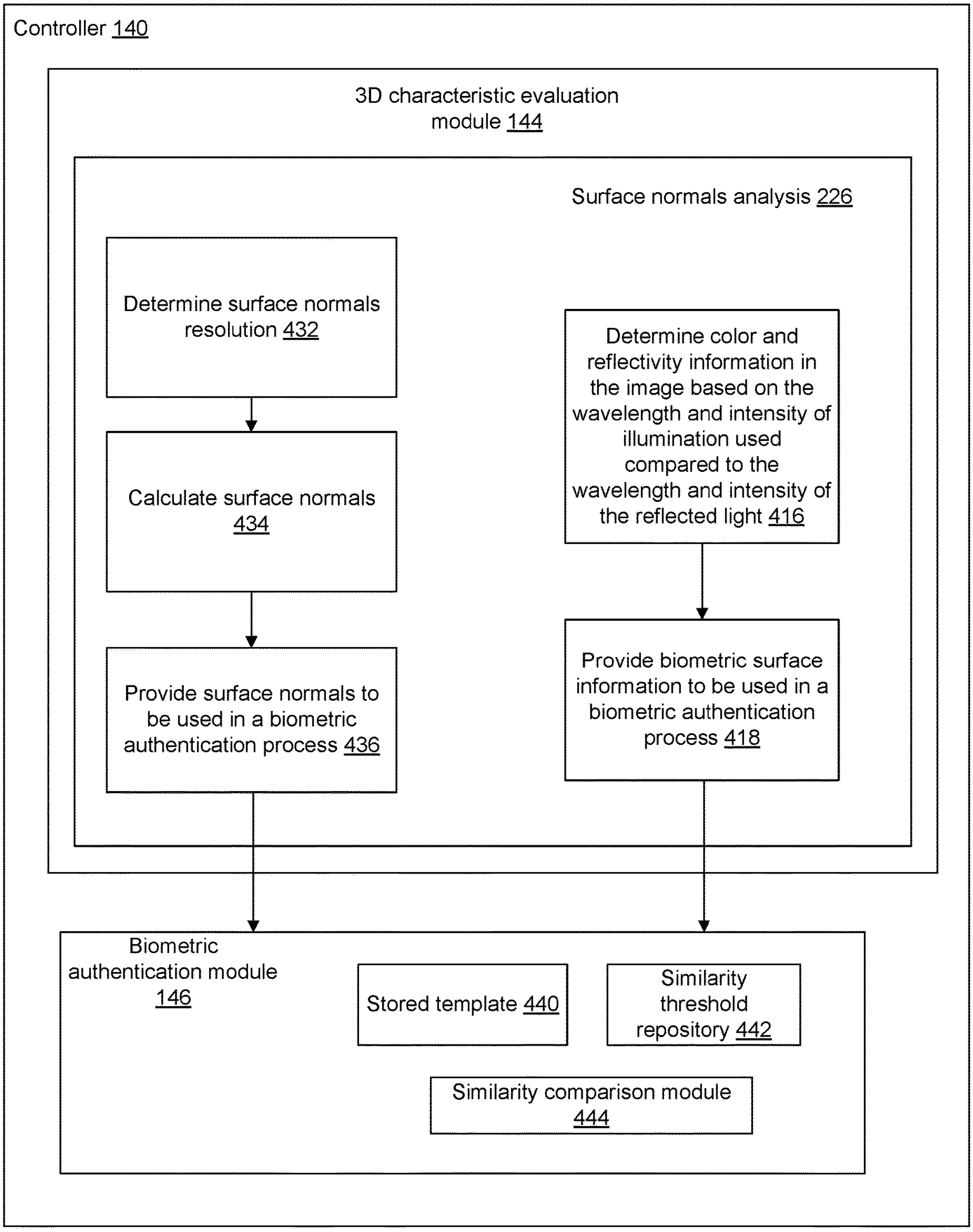
FIG. 4C is block diagram illustrating components of a periocular region 3D characteristic biometric authentication system that uses reconstructed surface normals to perform biometric authentication, according to some embodiments.

FIG. 4C is block diagram illustrating components of a periocular region 3D characteristic biometric authentication system that uses reconstructed surface normals to perform biometric authentication, according to some embodiments.

In FIG. 4C, the controller 140 implements 3D characteristic evaluation module 144, which uses a surface normals analysis 226. At 432, the surface normals analysis 226 module determines which portions of an input captured by the sensors 130 to generate surface normals from, or how far apart in the image the points at which surface normals are calculated should be. At 434, the module calculates the surface normal at the selected points. At 436, the 3D characteristic evaluation module 144 provides the surface normals to be used in a biometric authentication process. At 416, the 3D characteristic evaluation module 144 also determines color and reflectivity information from the input based on the wavelength and intensity of illumination used in comparison to the wavelength and intensity of the illumination configuration used, and at 418 provides this biometric surface information to be used in a biometric authentication process.

The biometric authentication process may be carried out by a biometric authentication module 146 via the controller 140. The biometric authentication module 146 may comprise a stored template 440, a similarity threshold repository 442, and a similarity comparison module 444. A similarity comparison module 444 may use the information provided by the 3D characteristic evaluation module 144 and the stored template 440 to generate a similarity score, which the biometric authentication module 146 may compare to thresholds stored in the similarity threshold repository 442 to determine what action should be taken as a result of the score generated by the similarity comparison module 444.

Figure 5:
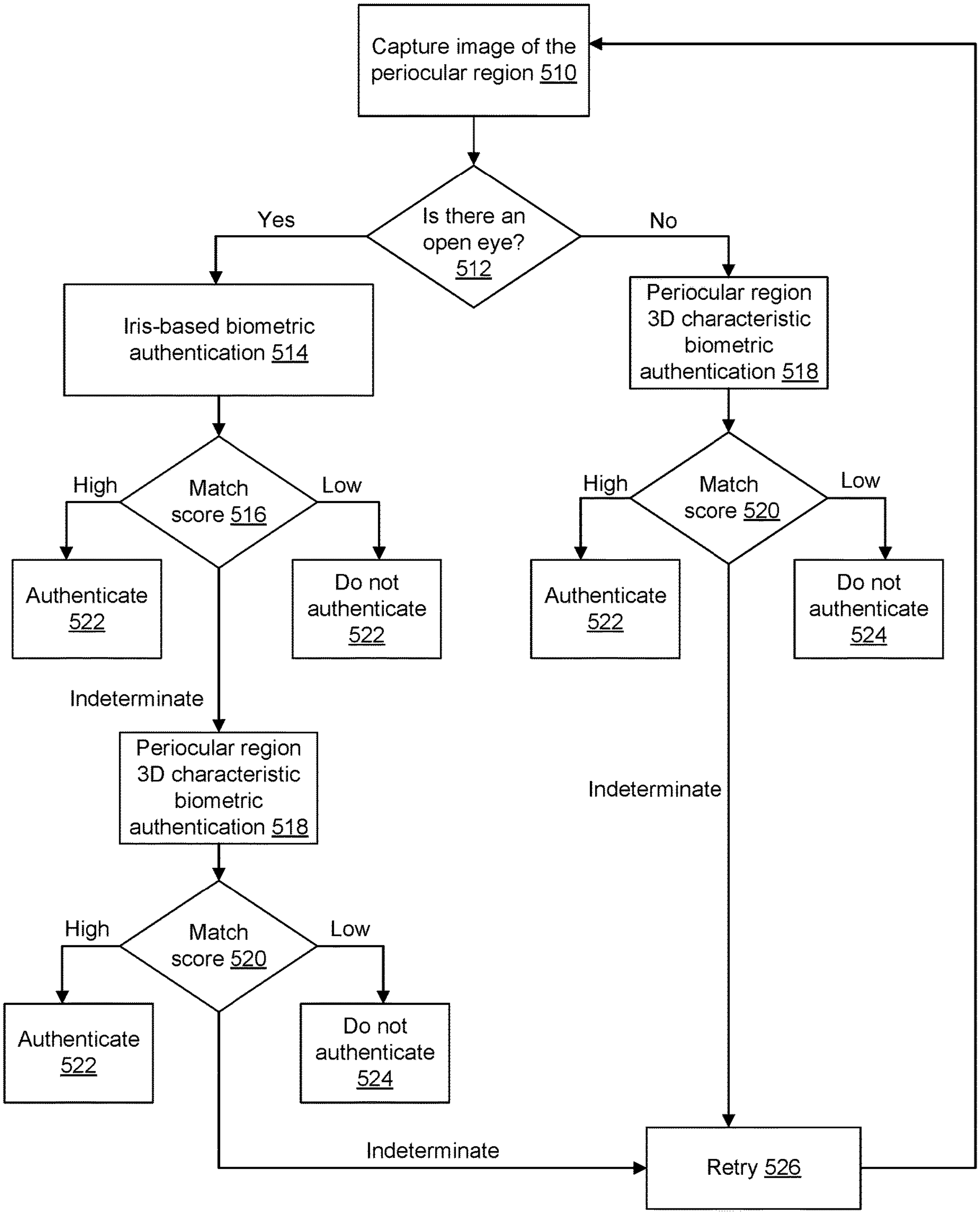
FIG. 5 is a process flow diagram illustrating a possible biometric authentication process using periocular region biometric authentication in conjunction with iris-based biometric authentication, according to some embodiments.

FIG. 5 is a process flow diagram illustrating a possible biometric authentication process using periocular region biometric authentication in conjunction with iris-based biometric authentication, according to some embodiments.

In the example biometric authentication process shown in FIG. 5, the process begins at 510 with a sensor 130 capturing an image of the periocular region. At 512, the controller 140 may decide whether there is an open eye in the image. If there is an open eye in the image, the process may proceed to 514 iris-based biometric authentication. If there is not an open eye in the image, the process may proceed to 518 periocular region 3D characteristic biometric authentication. At 516, a match score for the iris-based biometric authentication process may be generated by comparing an iris from the image to a stored iris. If the match score generated by comparing the input to a template is sufficiently high to be definite, according to a threshold, at 522 the biometric authentication process may authenticate. If the match score generated by comparing the input to a template is sufficiently low to be definite, according to a threshold, at 524 the biometric authentication process may not authenticate.

If the match score for the iris-based biometric authentication is not sufficiently high or low, it may be indeterminate and at 518 the biometric authorization process may proceed to a periocular region 3D characteristic biometric authentication process. In a periocular region 3D characteristic biometric authentication process at 520 a match score is generated by comparing periocular region 3D characteristics from the image to a stored template periocular region 3D characteristics. If the match score is sufficiently high, according to a threshold, at 522 the biometric authentication process may authenticate. If the match score is sufficiently low, according to a threshold, at 524 the biometric authentication process may not authenticate. If the match score is indeterminate, at 526 the biometric authentication process may retry by returning to 510 the image capture step.

Periocular region 3D characteristic biometric authentication may prevent a biometric authentication process from failing due to lack of an open eye or an indeterminate iris match. Iris-based biometric authentication used in this example may be part of another type of biometric identification, for example, eye-based biometric authentication.

In the example biometric authentication process in FIG. 5, periocular region 3D characteristic biometric analysis is used as a backup in the event iris-based biometric authentication cannot be completed. In some embodiments, periocular region 3D characteristic biometric authentication may be attempted before iris-based biometric authentication, which may avoid the need to expend computer resources on iris-based biometric authentication. In some embodiments, other methods of authentication may be used in some combination with periocular region 3D characteristic biometric authentication, for example, fingerprint biometric authentication or password authentication.

FIGS. 6A-D illustrate example 3D characteristics and other biometric surface information that may be used by a periocular region 3D characteristic biometric authentication system, according to some embodiments.

Figure 6A:
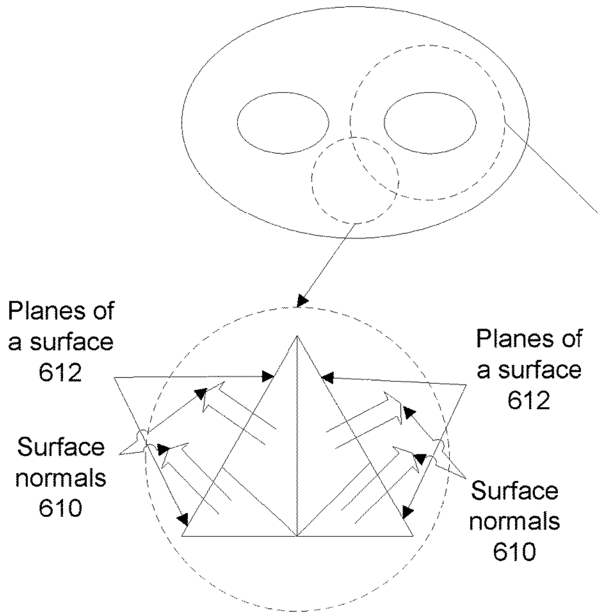
FIGS. 6A-D illustrate example 3D characteristics and other biometric surface information that may be used by a periocular region 3D characteristic biometric authentication system, according to some embodiments.

FIG. 6A depicts a portion of the periocular region (e.g., a nose) that has been divided into four planes 612, each of which has a surface normal 610 associated with it. Surface normals 610 are vectors normal to the plane of a surface 612. Surface normals 610 may be 3D characteristics that may be used in biometric authentication. In some embodiments, surface normals may be generated by first dividing an image into sections and determining the surface normals of the sections or by finding the surface normals at some set frequency across the image. Surface normals may be associated with or based on other surface direction information. For example, shading may indicate surface direction information. Shading may be associated with the direction of incoming light, the position of a camera, the direction of the surface, and the albedo of the surface.

Figure 6B:
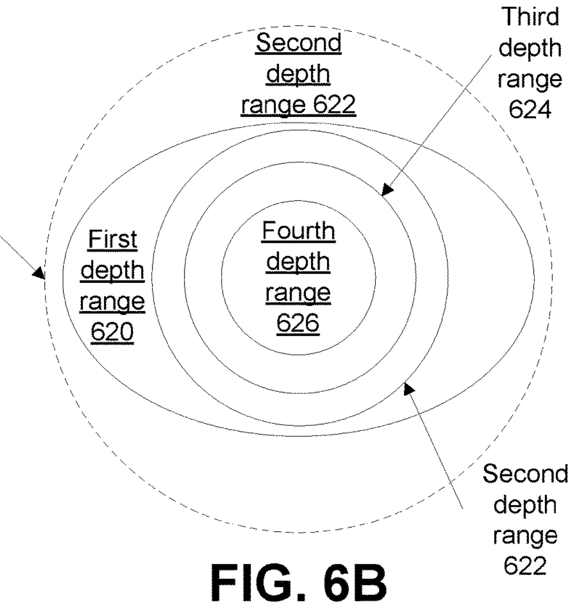

FIG. 6B depicts a contour map, which may be a type of 3D reconstruction. This contour map has four depth ranges, 620, 622, 624, and 626. The outside of the contour map is uniformly in the second depth range 622. Moving inward from the outside edge, the depth increases to the deepest depth range, the first depth range 620. Moving further inward, the depth decreases to the second depth range 622 again, and then continues decreasing through the third depth range 624 to the highest depth range, the fourth depth range 626 in the center. A contour map such as this one may represent an approximation of 3D characteristics in a two-dimensional format. This example contour map is of an eye, but a contour map may be of another feature of the periocular region or the entire periocular region.

Figure 6C:
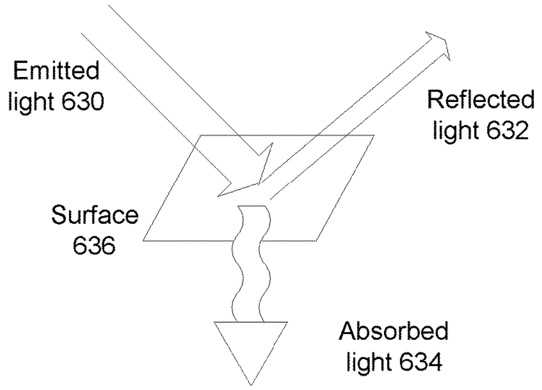

FIG. 6C depicts emitted light 630 being reflected off of a surface 636 and becoming reflected light 632. When emitted light 630 is reflected off of a surface 636, some light may be absorbed 634, so the reflected light 632 may have a lower intensity than the emitted light 630. The change in intensity from emitted light 630 to reflected light 632 may allow calculation of the surface's 636 reflectivity. Some of the absorbed light 634 may be light of specific wavelengths, as shown in FIG. 6D.

Figure 6D:
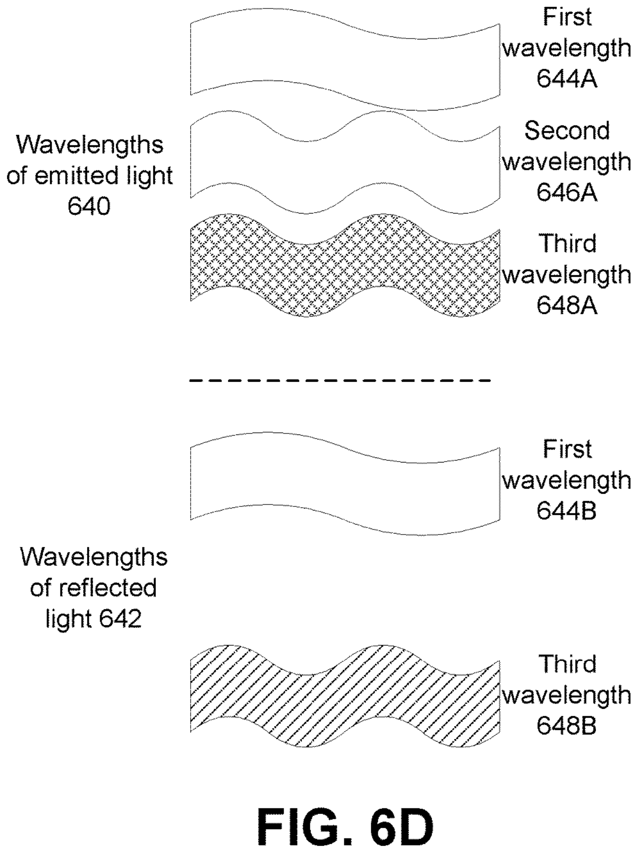

FIG. 6D also shows a change that may occur when light is reflected off a surface 636, focusing on the absorption 634 of some wavelengths of emitted light 630 by the surface 626 so that the reflected light 632 may not include some wavelengths or may partially include some wavelengths. In this example, after the emitted light 630 interacts with the surface 636, the first wavelength 644A of emitted light 640 is unchanged 644B after interacting with the surface 636 and becoming reflected light 642. The second wavelength 646A was completely absorbed by the surface 636 and is not present among the wavelengths of reflected light 642. The third wavelength 648 was partially absorbed by the surface 636 and is less intense as reflected light 648B. These changes in wavelength between emitted light 640 and reflected light 642 may allow calculation of the surface's 636 color. In some embodiments, color and reflectivity may be biometric surface information that can be used to supplement 3D characteristics in a periocular region 3D characteristic biometric authentication system 142.

Figure 7:
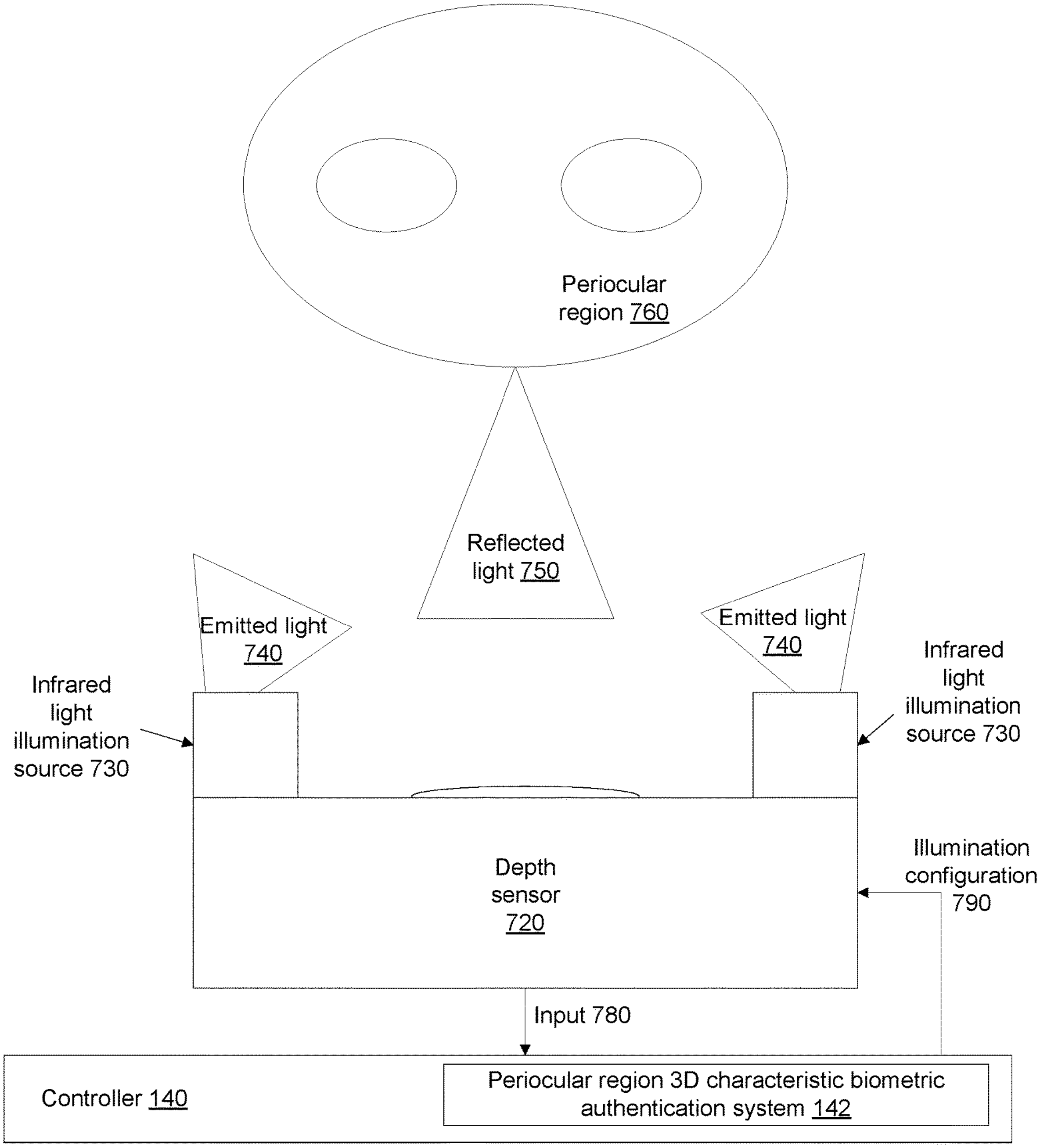
FIG. 7 illustrates a depth sensor configured to obtain measured depth information of a periocular region, according to some embodiments.

FIG. 7 illustrates a depth sensor configured to obtain measured depth information of a periocular region, according to some embodiments.

A depth sensor 720 may use one or more infrared light illumination sources 730 to emit light 740. An infrared light illumination source 730 may allow a sensor such as a depth sensor 720, to obtain measured depth values unobtrusively to the user. When the emitted light 740 from the infrared light illumination source 730 interacts with the periocular region 760, some light may be reflected 750 back to the depth sensor 720. The reflected light 750 may enable measurement of depth values of the periocular region 760. In some embodiments, these measured depth values may be used as depth information, which may be a type of 3D characteristic.

A controller 140 may direct the infrared light illumination sources 730 and depth sensor 720 by sending an illumination configuration 790 to the invisible light illumination sources 730 and receiving input 780 from the depth sensor 720. The controller may be the same controller that runs a periocular region 3D characteristic biometric authentication system 142 using the input 780 from the depth sensor 720.

Figure 8:
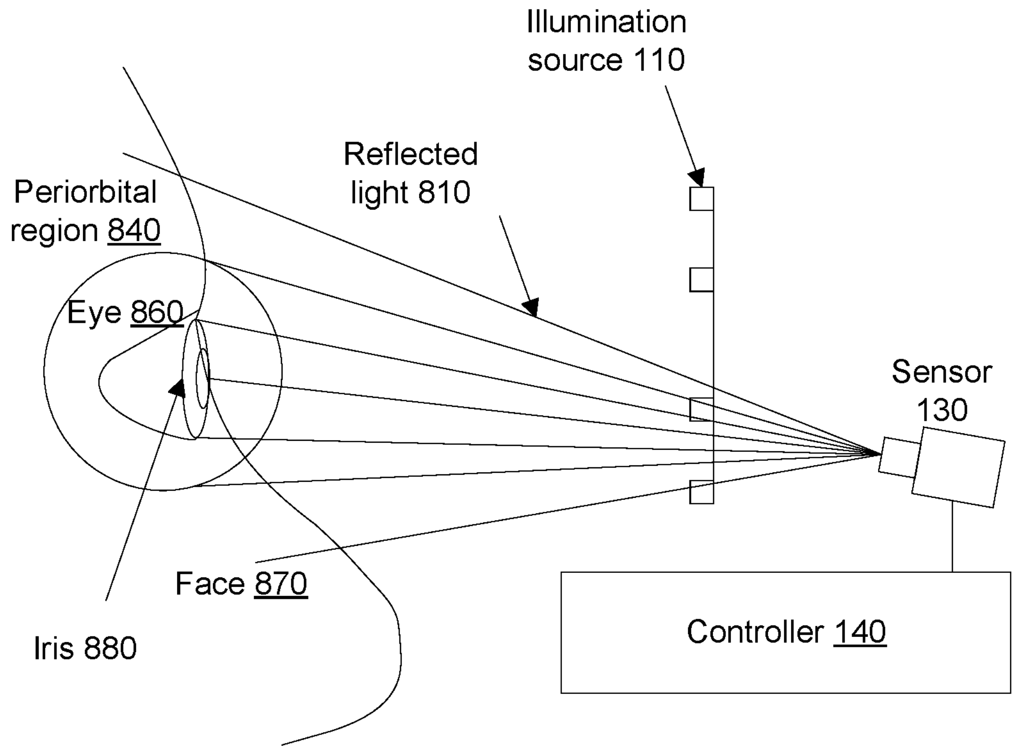
FIG. 8 illustrates an illumination source and sensor that can be used to capture data including 3D characteristics for a periocular region, and also illustrates a controller that receives the captured sensor data, according to some embodiments.

FIG. 8 illustrates an illumination source and sensor that can be used to capture data including 3D characteristics for a periocular region, and also illustrates a controller that receives the captured sensor data, according to some embodiments.

FIG. 8 illustrates an example imaging system that generates input of the periocular region. The imaging system may include, but is not limited to, one or more sensors 130, an illumination source 110, and a controller 140. In this example, a camera 130 is pointed towards the eye 860, iris 880, periorbital region 840, and portions of the face 870 to receive reflected light 810. Note, however, in some configurations, the camera 130 may be mounted on a device that is physically connected to the face (shown in FIG. 9A-9C). The camera(s) 130 may capture individual images of, or images that include, one or more of the eye 860, iris 880, periorbital region 840, and/or portions of the face 870 and shadows 102 created by the interaction of those features with light emitted from the illumination source 110. The captured image(s) may be processed by the controller 140 in a periocular region 3D characteristic biometric authentication system 142.

Figure 9A:
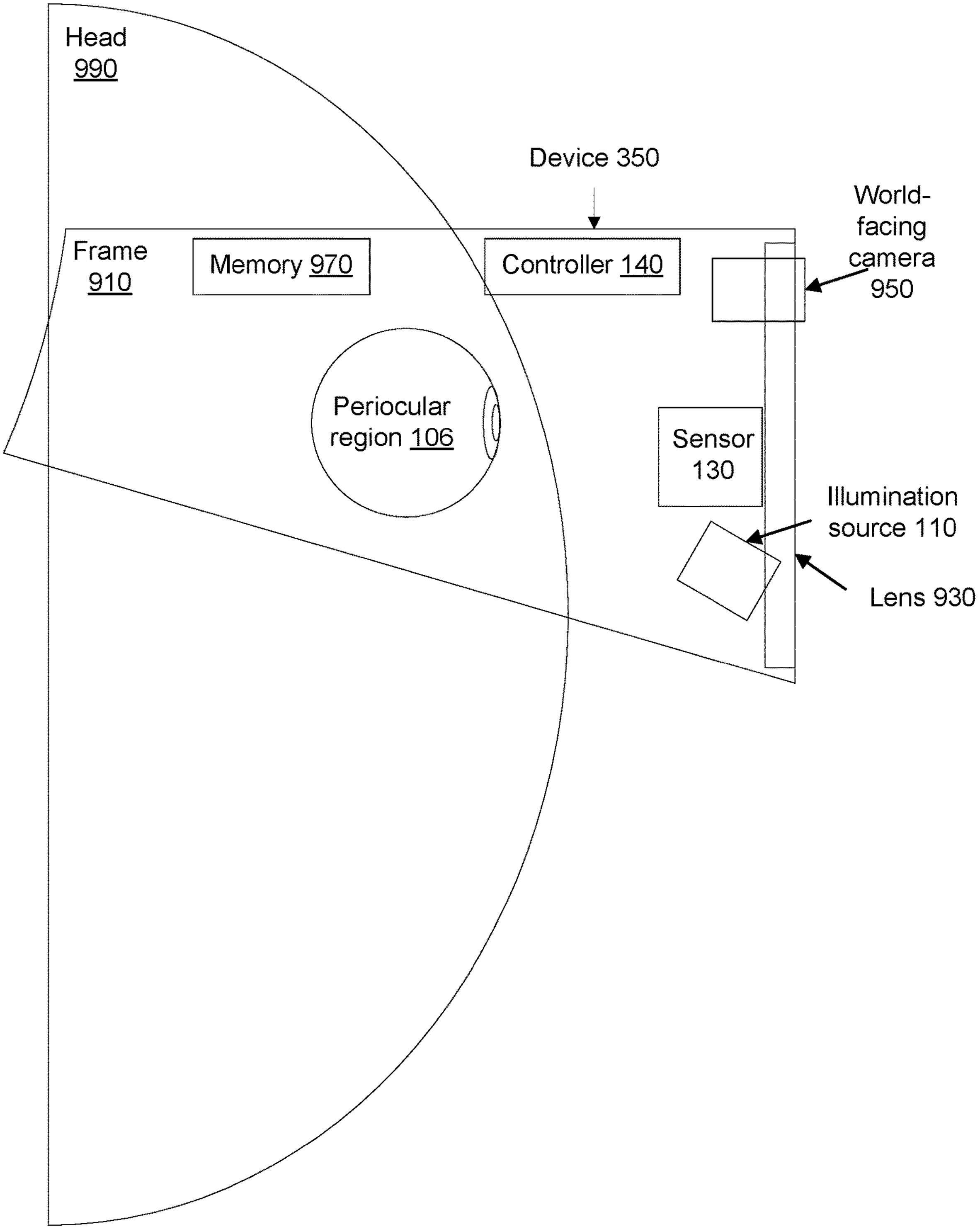
FIGS. 9A-C illustrate example devices that could be used to implement a periocular region 3D characteristic biometric authentication system, according to some embodiments.
Figure 9B:
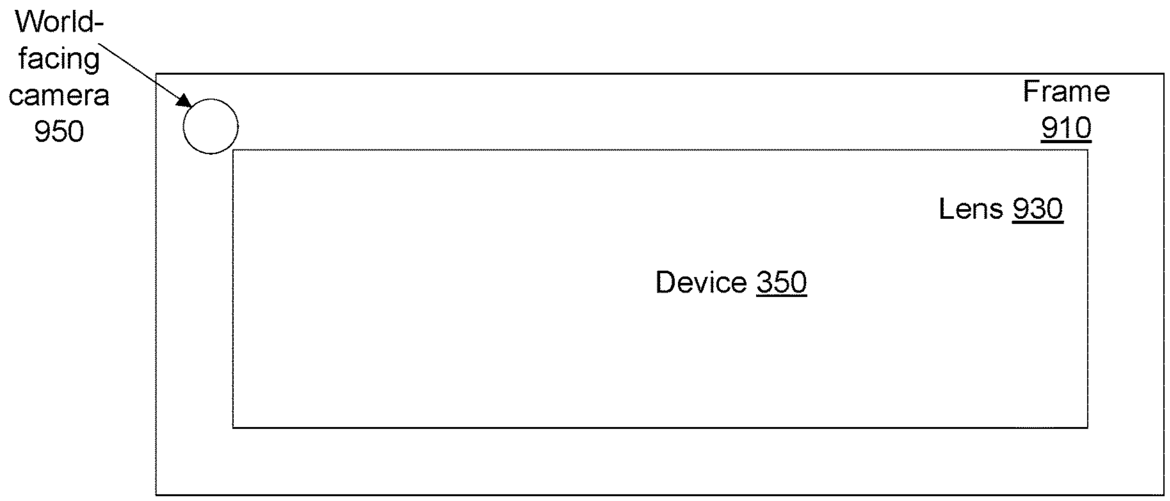
Figure 9C:
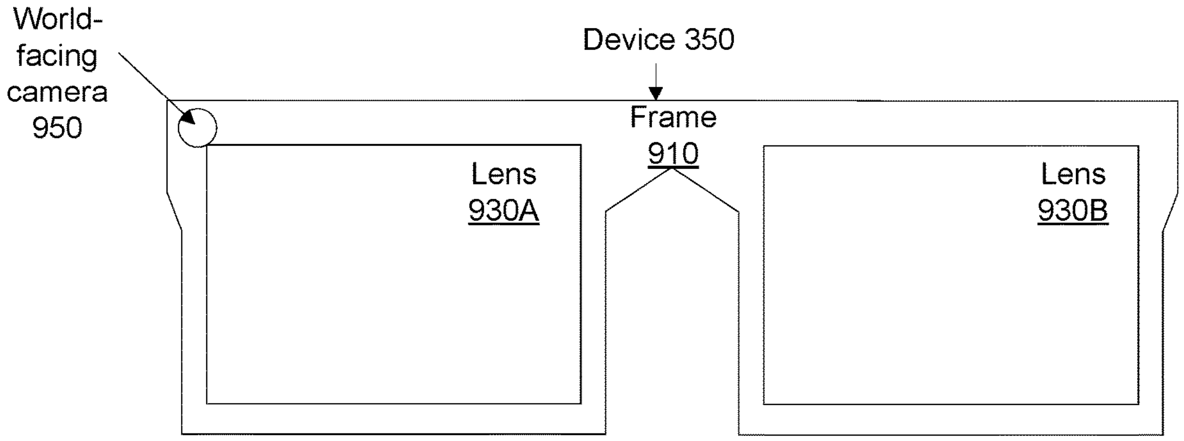

FIGS. 9A-C illustrate example devices that could be used to implement a periocular region 3D characteristic biometric authentication system, according to some embodiments.

FIG. 9A illustrates an example head-mounted device (HMD) that may include components and implement methods as illustrated in FIGS. 1 through 8, according to some embodiments. As shown in FIG. 9A, the HMD may be positioned on the user's head 990 such that the display is disposed in front of the user's eyes. The user looks through the eyepieces onto the display.

FIGS. 9A-C illustrate example devices in which the methods of FIGS. 1 through 8 may be implemented, according to some embodiments. Note that the devices 350 as illustrated in FIGS. 9A through 9C are given by way of example and are not intended to be limiting. In various embodiments, the shape, size, and other features of an HMD may differ, as may the locations, numbers, types, and other features of the components of an HMD and of the eye imaging system. FIG. 9A shows a side view of an example HMD, and FIGS. 9B and 9C show alternative front views of example HMDs, with FIG. 9B showing a device 350 that has one lens 930 that covers both eyes and FIG. 9C showing a device 350 that has right 930A and left 930B lenses.

The HMD may include lens(es) 930, mounted in a wearable housing or frame 910. The HMD may be worn on a user's (the "wearer") head 990 so that the lens(es) 930 is disposed in front of the wearer's eyes. In some embodiments, an HMD may implement any of various types of display technologies or display systems. For example, the HMD may include a display system that directs light that forms images (virtual content) through one or more layers of waveguides in the lens(es) 930; output couplers of the waveguides (e.g., relief gratings or volume holography) may output the light towards the wearer to form images at or near the wearer's eyes.

As another example, the HMD may include a direct retinal projector system that directs light towards reflective components of the lens(es); the reflective lens(es) 930 is configured to redirect the light to form images at the wearer's eyes. In some embodiments the display system may change what is displayed to at least partially affect the conditions and features of the periocular region 106 for the purpose of biometric authentication. For example, the display may increase the brightness to change the conditions of the periocular region 106 such as lighting that is affecting the periocular region 106. As another example, the display may change the distance an object appears on the display to affect the conditions of the eye such as the accommodation distance of the eye.

In some embodiments, HMD may also include one or more sensors that collect information about the wearer's environment (video, depth information, lighting information, etc.) and about the wearer (e.g., eye or gaze sensors). The sensors may include one or more of, but are not limited to one or more sensors 130 (e.g., infrared (IR) cameras) that capture views of the user's periocular region 106, one or more world-facing or PoV cameras 950 (e.g., RGB video cameras) that can capture images or video of the real-world environment in a field of view in front of the user, and one or more ambient light sensors that capture lighting information for the environment. Cameras 130 and 950 may be integrated in or attached to the frame 910. The HMD may also include one or more illumination sources 110 such as LED or infrared point light sources that emit light (e.g., light in the IR portion of the spectrum) towards the user's periocular region 106.

A controller 140 for a periocular region 3D characteristic biometric authentication system 142 may be implemented in the HMD, or alternatively may be implemented at least in part by an external device (e.g., a computing system or handheld device) that is communicatively coupled to the HMD via a wired or wireless interface. Controller 140 may include one or more of various types of processors, image signal processors (ISPs), graphics processing units (GPUs), coder/decoders (codecs), system on a chip (SOC), CPUs, and/or other components for processing and rendering video and/or images.

Memory 970 for the periocular region 3D characteristic biometric authentication system 142 may be implemented in the HMD, or alternatively may be implemented at least in part by an external device (e.g., a computing system) that is communicatively coupled to the HMD via a wired or wireless interface. The memory 970 may, for example, be used to record video or images captured by the one or more cameras 950 integrated in or attached to frame 910. Memory 970 may include any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc.

In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used in an HMD to store processed data, such as Flash or other "hard drive" technologies. This other storage may be separate from the externally coupled storage mentioned below.

While FIG. 9A only shows an illumination source 110 and cameras 130 and 950 for one eye, embodiments may include illumination sources 110 and cameras 130 and 950 for each eye, and user authentication may be performed for both eyes. In addition, the illumination source 110, camera 130, and PoV camera 950 may be located elsewhere than shown. An HMD can have an opaque display, or can use a see-through display, which allows the user to see the real environment through the display, while displaying virtual content overlaid on the real environment.

Figure 10:
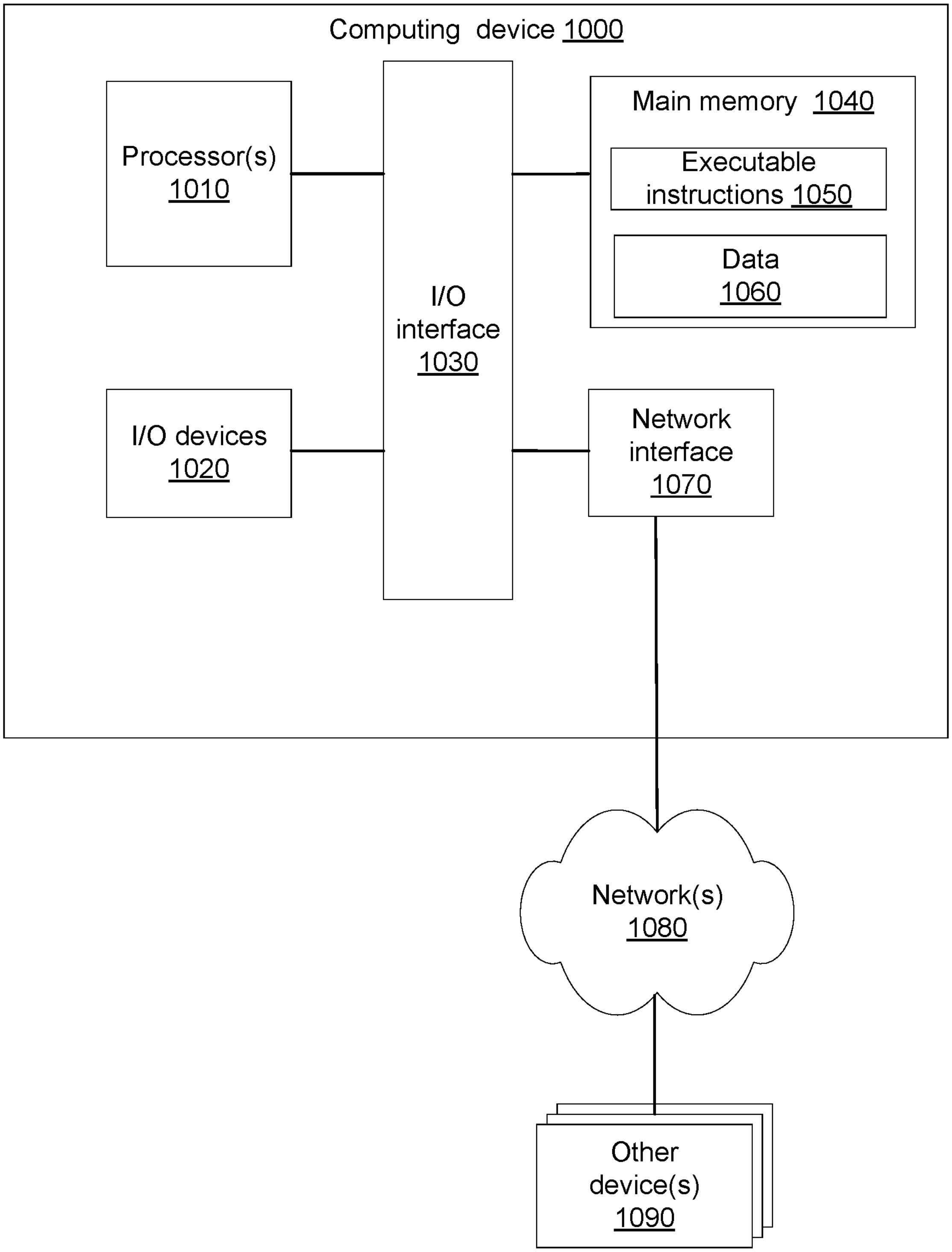
FIG. 10 is a block diagram illustrating an example computing device that may be used, according to some embodiments.

FIG. 10 is a block diagram illustrating an example computing device that may be used, according to some embodiments.

In at least some embodiments, a computing device that implements a portion or all of one or more of the techniques described herein may include a general-purpose computer system that includes or is configured to access one or more computer-accessible media. FIG. 10 illustrates such a general-purpose computing device 1000. In the illustrated embodiment, computing device 1000 includes one or more processors 1010 coupled to a main memory 1040 (which may comprise both non-volatile and volatile memory modules and may also be referred to as system memory) via an input/output (I/O) interface 1030. Computing device 1000 further includes a network interface 1070 coupled to I/O interface 1030, as well as additional I/O devices 1020 which may include sensors of various types.

In various embodiments, computing device 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some implementations, graphics processing units (GPUs) may be used instead of, or in addition to, conventional processors.

Memory 1040 may be configured to store instructions and data accessible by processor(s) 1010. In at least some embodiments, the memory 1040 may comprise both volatile and non-volatile portions; in other embodiments, only volatile memory may be used. In various embodiments, the volatile portion of system memory 1040 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 1050 and data 1060 implementing one or more desired functions, such as those methods, techniques, and data described above, are shown stored within main memory 1040.

In one embodiment, I/O interface 1030 may be configured to coordinate I/O traffic between processor 1010, main memory 1040, and various peripheral devices, including network interface 1070 or other peripheral interfaces such as various types of persistent and/or volatile storage devices, sensor devices, etc. In some embodiments, I/O interface 1030 may perform any necessary protocol, timing, or other data transformations to convert data signals from one component (e.g., main memory 1040) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to memory 1040, may be incorporated directly into processor 1010.

Network interface 1070 may be configured to allow data to be exchanged between computing device 1000 and other devices 1090 attached to a network or networks 1080, such as other computer systems or devices. In various embodiments, network interface 1070 may support communication via any suitable wired or wireless general data networks, such as types of Ethernet network, for example. Additionally, network interface 1070 may support communication via telecommunications/telephony networks such as analog voice networks or digital fiber communications networks, via storage area networks such as Fibre Channel SANs, or via any other suitable type of network and/or protocol.

In some embodiments, main memory 1040 may be one embodiment of a computer-accessible medium configured to store program instructions and data as described above for FIG. 1 through FIG. 9 for implementing embodiments of the corresponding methods and apparatus. In some embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computing device 1000 via I/O interface 1030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1000 as main memory 1040 or another type of memory. Further, a computer-accessible medium may include transmission media or signals such as electrical, electromagnetic, or digital signals, conveyed via a communication medium such as a network and/or a wireless link, such as may be implemented via network interface 1070. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system comprising:

one or more illumination sources;

one or more camera configured to capture reflected light from the one or more illumination sources that has been reflected off of one or more biometric aspects of a periocular region of a user, wherein the reflected light comprises information about shadows which comprises information about 3D characteristics of the biometric aspect of the periocular region; and a processor configured to:

receive input from the one or more camera comprising the information about the shadows which comprises the information about the 3D characteristics of the one or more biometric aspects of the periocular region;

determine, based on the received input comprising the information about the shadows which comprises the information about the 3D characteristics, one or more 3D characteristics for the one or more biometric aspects of the periocular region; and perform a periocular region user authentication process using biometric surface information that comprises the determined one or more 3D characteristics, wherein the periocular region user authentication process comprises comparing the biometric surface information to a stored biometric template.

2. The system of claim 1 wherein the 3D characteristics of the one or more biometric aspects comprise one or more of:

depth information of a surface of the one or more biometric aspects;

one or more surface normal of a surface of the one or more biometric aspects; and a three-dimensional reconstruction of the one or more biometric aspects.

3. The system of claim 2 wherein the depth information is indicated in the received input via:

information in two-dimensional images indicative of depth values of the surface of the biometric aspect.

4. The system of claim 1 wherein the biometric surface information further comprises one or more of:

reflectivity of the surface of the one or more biometric aspects; or color of the one or more biometric aspects.

5. The system of claim 1 wherein:

said determining one or more 3D characteristics is performed using a trained machine learning model; and the determined one or more 3D characteristics are embedded features generated as part of an inference generation process using the trained machine learning model.

6. The system of claim 1 wherein the periocular region user authentication process is performed as part of a user authentication process wherein the user authentication process further comprises an iris-based user authentication process.

7. The system of claim 1 wherein the system further comprises a head-mounted device.

8. One or more non-transitory, computer-readable, storage media, storing program instructions that when executed using one or more processors cause the one or more processors to:

receive input from one or more camera comprising information about shadows which comprises information about 3D characteristics of one or more biometric aspects of a periocular region;

determine, based on the received input comprising the information about the shadows which comprises the information about the 3D characteristics, one or more 3D characteristics for the one or more biometric aspects of the periocular region; and perform a user authentication process using biometric surface information that comprises the determined one or more 3D characteristics, wherein the user authentication process comprises comparing the biometric surface information to a stored biometric template.

9. The computer readable storage media of claim 8 wherein the 3D characteristics comprise one or more of:

depth information of a surface of the one or more biometric aspects;

one or more surface normal of a surface of the one or more biometric aspects; and a three-dimensional reconstruction of the one or more biometric aspects.

10. The computer-readable storage media of claim 8 wherein the program instructions, when executed on or across the one or more processors further cause the one or more processors to determine the 3D characteristics by using a trained machine learning model, wherein the determined one or more 3D characteristics are embedded features generated as part of an inference generation process using the trained machine learning model.

11. The computer-readable storage media of claim 10 wherein the trained machine learning model is trained on a dataset comprising images of the periocular region comprising labeled:

open eyes; and closed eyes.

12. The computer-readable storage media of claim 10 wherein the trained machine learning model is trained on a dataset comprising synthetic images labeled with 3D characteristics.

13. The computer-readable storage media of claim 10 wherein the trained machine learning model is trained on a dataset comprising:

images annotated as valid images for authentication; and images annotated as invalid images for authentication.

14. The computer-readable storage media of claim 10 wherein to perform the user authentication process the processor uses inferences generated from the trained machine learning model without directly calculating the 3D characteristics.

15. The computer-readable storage media of claim 8 wherein:

the 3D characteristics include one or more surface normals; and the processor is configured to filter out one or more surface normals corresponding to biometric aspects not likely to comprise unique data.

16. A method, comprising:

receiving input from one or more sensors comprising information about 3D characteristics of one or more biometric aspects of a periocular region;

determining, based on the received input comprising the information about the 3D characteristics, one or more 3D characteristics for the one or more biometric aspect of the periocular region, wherein said determining the one or more 3D characteristics comprises determining surface normals; and performing a user authentication process using biometric surface information that comprises the determined one or more 3D characteristics, wherein the user authentication process comprises comparing the biometric surface information to a stored biometric template.

17. The method of claim 16 wherein the 3D characteristics comprise one or more of:

depth information of a surface of the one or more biometric aspects;

one or more surface normal of a surface of the one or more biometric aspects; and a three-dimensional reconstruction of the one or more biometric aspects.

18. The method of claim 16 wherein performing a user authentication process further comprises generating a biometric template to compare to the stored biometric template.

19. The method of claim 16 wherein the periocular region user authentication process is performed alternatively to an iris-based user authentication process upon a determination that insufficient iris information has been obtained to permit an iris-based user authentication.

20. The method of claim 16 wherein:

said determining one or more 3D characteristics is performed using a trained machine learning model; and the determined one or more 3D characteristics are embedded features generated as part of an inference generation process using the trained machine learning model.

* * * * *